United States Patent
Yang et al.

(10) Patent No.: US 12,058,362 B2
(45) Date of Patent: Aug. 6, 2024

(54) INTER PREDICTION METHOD AND APPARATUS

(71) Applicant: HUAWEI TECHNOLOGIES CO., LTD., Guangdong (CN)

(72) Inventors: Haitao Yang, Shenzhen (CN); Fan Mu, Shenzhen (CN); Xiang Ma, Shenzhen (CN); Huanbang Chen, Shenzhen (CN); Lian Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 301 days.

(21) Appl. No.: 17/389,873

(22) Filed: Jul. 30, 2021

(65) Prior Publication Data

US 2021/0360275 A1     Nov. 18, 2021

Related U.S. Application Data

(63) Continuation of application No. PCT/CN2019/119406, filed on Nov. 19, 2019.

(30) Foreign Application Priority Data

Feb. 1, 2019  (CN) .......................... 201910104883.3
Mar. 14, 2019 (CN) .......................... 201910194096.2

(51) Int. Cl.
*H04N 19/51* (2014.01)
*H04N 19/105* (2014.01)
(Continued)

(52) U.S. Cl.
CPC ........... *H04N 19/51* (2014.11); *H04N 19/105* (2014.11); *H04N 19/132* (2014.11); *H04N 19/159* (2014.11); *H04N 19/176* (2014.11)

(58) Field of Classification Search
None
See application file for complete search history.

(56) References Cited

U.S. PATENT DOCUMENTS 9,438,910 B1      9/2016  Han et al.
2017/0332095 A1  11/2017  Zou et al.
(Continued)

FOREIGN PATENT DOCUMENTS

CN      101710985 A    5/2010
CN      102215389 A   10/2011
(Continued)

OTHER PUBLICATIONS

Bordes P et al: Description of SDR, HDR and 360 video codingtechnology proposal by Qualcomm and Technicolor—medium complexityversion122. MPEG Meeting; Apr. 16, 2018-Apr. 20, 2018; San Diego; (Motionpicture Expert Group or ISO/IEC JTC1/SC29/WG11), No. m42353 Apr. 12, 2018 (Apr. 12, 2018), XP030261572, Retrieved from the Internet:URL:http://phenix.int-evry.fr/mpeg/doc_end_user/documents/122_San.

(Continued)

*Primary Examiner* — Reza Aghevli
(74) *Attorney, Agent, or Firm* — WOMBLE BOND DICKINSON (US) LLP

(57) ABSTRACT

The inter prediction method is provided, which includes: obtaining a predicted sample value of a current affine block; determining one or more luminance compensation blocks based on motion vectors of one or more subblocks of the current affine block; determining a linear model coefficient based on a first sample set and a second sample set, where the first sample set includes at least one reconstructed sample neighboring to an edge of the current affine block, the second sample set includes at least one reconstructed sample neighboring to an edge of the one or more luminance compensation blocks, and the sample in the first sample set (Continued)

is in a one-to-one correspondence with the sample in the second sample set; and updating the predicted sample value of the current affine block based on the linear model coefficient, to obtain an updated predicted sample value of the current affine block.

20 Claims, 17 Drawing Sheets

(51) Int. Cl.
*H04N 19/132* (2014.01)
*H04N 19/159* (2014.01)
*H04N 19/176* (2014.01)

(56) References Cited

U.S. PATENT DOCUMENTS

| | | | |
|---|---|---|---|
| 2018/0098087 A1* | 4/2018 | Li | H04N 19/132 |
| 2018/0270500 A1 | 9/2018 | Li et al. | |
| 2020/0236390 A1* | 7/2020 | Galpin | H04N 19/439 |
| 2020/0244968 A1* | 7/2020 | Jun | H04N 19/52 |
| 2020/0280735 A1* | 9/2020 | Lim | H04N 19/523 |
| 2020/0413040 A1* | 12/2020 | Lim | H04N 19/105 |
| 2021/0051345 A1* | 2/2021 | Tsai | H04N 19/52 |
| 2021/0105482 A1* | 4/2021 | Zhang | H04N 19/96 |
| 2021/0195227 A1* | 6/2021 | Lee | H04N 19/523 |
| 2021/0227209 A1* | 7/2021 | Liu | H04N 19/80 |
| 2021/0235110 A1* | 7/2021 | Liu | H04N 19/52 |
| 2021/0344969 A1* | 11/2021 | Zhang | H04N 19/88 |
| 2021/0352280 A1* | 11/2021 | Kang | H04N 19/105 |
| 2021/0368172 A1* | 11/2021 | Lim | H04N 19/96 |
| 2022/0060744 A1* | 2/2022 | Lee | H04N 19/105 |

FOREIGN PATENT DOCUMENTS

| | | | | |
|---|---|---|---|---|
| CN | 103533374 A | 1/2014 | | |
| CN | 107147911 A | 9/2017 | | |
| CN | 107534770 A | 1/2018 | | |
| CN | 107690810 A | 2/2018 | | |
| CN | 108965871 A | 12/2018 | | |
| WO | 2018064492 A1 | 4/2018 | | |
| WO | WO-2018064492 A1 * | 4/2018 | ........... | H04N 19/105 |
| WO | 2018128379 A1 | 7/2018 | | |
| WO | WO-2019006363 A1 * | 1/2019 | ........... | H04N 19/577 |
| WO | WO-2020155791 A1 * | 8/2020 | ........... | H04N 19/105 |

OTHER PUBLICATIONS

ITU-T H.261 (Mar. 1993), Line Transmission of Non-Telephone Signals, Video Codec for Audiovisual Services AT p x 64 kbits, total 29 pages.

ITU-T H.263(Jan. 2005), Series H: Audiovisual and Multimedia Systems, Infrastructure of audiovisual services—Coding of moving video, Video coding for low bit rate communication, total 226 pages.

ITU-T H.264(Apr. 2017), Series H: Audiovisual and Multimedia Systems, Infrastructure of audiovisual services—Coding of moving video, Advanced video coding for generic audiovisual services, total 812 pages.

ITU-T H.265(Feb. 2018), Series H: Audiovisual and Multimedia Systems Infrastructure of audiovisual services—Coding of moving video, High efficiency video coding, total 692 pages.

\* cited by examiner

INTER PREDICTION METHOD AND APPARATUS

CROSS-REFERENCE TO RELATED APPLICATIONS

This application is a continuation of International Application No. PCT/CN2019/119406, filed on Nov. 19, 2019, which claims priority to Chinese Patent Application No. 201910104883.3, filed on Feb. 1, 2019, and to Chinese Patent Application No. 201910194096.2, filed on Mar. 14, 2019. All of the aforementioned patent applications are hereby incorporated herein by reference in their entireties.

TECHNICAL FIELD

This disclosure relates to the field of video coding technologies, and more specifically, to an inter prediction method and apparatus.

BACKGROUND

A digital video capability can be incorporated into a wide variety of apparatuses, including a digital television, a digital live broadcast system, a wireless broadcast system, a personal digital assistant (PDA), a laptop or desktop computer, a tablet computer, an e-book reader, a digital camera, a digital recording apparatus, a digital media player, a video game apparatus, a video game console, a cellular or satellite radio phone (namely "smartphone"), a video conferencing apparatus, a video streaming apparatus, and the like. A digital video apparatus implements video compression technologies, such as video compression technologies described in standards defined in MPEG-2, MPEG-4, ITU-T H.263, and ITU-T H.264/MPEG-4 part 10 advanced video coding (AVC), a video coding standard H.265/high efficiency video coding (HEVC) standard, and extensions of such standards. The video apparatus can more efficiently transmit, receive, encode, decode, and/or store digital video information by implementing such video compression technologies.

The video compression technologies are used to perform spatial (intra-picture) prediction and/or temporal (inter-picture) prediction to reduce or remove inherent redundancy in video sequences. In block-based video coding, a video slice (namely, a video frame or a part of a video frame) may be partitioned into picture blocks, and the picture block may also be referred to as a tree block, a coding unit (CU), and/or a coding node. A picture block in a to-be-intra-coded (I) slice of a picture is coded through spatial prediction based on a reference sample in a neighboring block in the same picture. For a picture block in a to-be-inter-coded (P or B) slice of a picture, spatial prediction based on a reference sample in a neighboring block in the same picture or temporal prediction based on a reference sample in another reference picture may be used. A picture may be referred to as a frame, and a reference picture may be referred to as a reference frame.

To improve accuracy of inter prediction performed on a non-translational moving object, an affine motion model may be used for the inter prediction.

When inter prediction is performed based on the affine motion model, a motion vector of a control point of a current block may be first determined, and then a motion vector value of each subblock in the current block is obtained. Finally, motion compensation is performed based on a motion vector of each subblock to obtain a predicted sample value of each subblock, so as to obtain a predicted sample value of the current block.

However, in some cases, because there is a luminance difference between the current block and a reference block corresponding to the current block, the accuracy of the inter prediction is not very high.

SUMMARY

This disclosure provides an inter prediction method and apparatus, to improve accuracy of inter prediction.

According to an embodiment, an inter prediction method is provided. The method includes: obtaining a predicted sample value of a current affine block: determining one or more luminance compensation blocks based on motion vectors of one or more subblocks of the current affine block: determining a linear model coefficient based on a first sample set and a second sample set: and updating the predicted sample value of the current affine block based on the linear model coefficient, to obtain an updated predicted sample value of the current affine block.

The first sample set includes at least one reconstructed sample neighboring to an edge of the current affine block, the second sample set includes at least one reconstructed sample neighboring to an edge of the one or more luminance compensation blocks, and the sample in the first sample set is in a one-to-one correspondence with the sample in the second sample set.

Optionally, the obtaining a predicted sample value of a current affine block includes: determining, based on a motion vector of each subblock in the current affine block, a reference subblock corresponding to each subblock: and determining a predicted sample value of each subblock based on a reconstructed sample value of the reference subblock corresponding to each subblock, to obtain the predicted sample value of the current affine block.

Optionally, reconstructed samples included in the first sample set and the second sample set may be specifically luminance values of the samples (Y component values of the samples).

It should be understood that, when the predicted sample value of each subblock is determined based on the reconstructed sample value of the reference subblock corresponding to each subblock, the reconstructed sample value of the reference subblock corresponding to each subblock may be directly determined as the predicted sample value of the subblock.

In this disclosure, luminance compensation is performed on the predicted sample value of the current affine block, to improve accuracy of inter prediction, reduce a residual value, and when video quality is the same, reduce a bit rate, to further improve coding performance.

It should be understood that the luminance compensation in this disclosure refers to local illumination compensation. For brevity of language, the luminance compensation is uniformly used in subsequent descriptions in this disclosure.

In an embodiment, the determining one or more luminance compensation blocks based on motion vectors of one or more subblocks of the current affine block includes: determining, based on the motion vector of each of the plurality of subblocks of the current affine block, a luminance compensation block corresponding to each subblock, to obtain the plurality of luminance compensation blocks.

Optionally, the plurality of subblocks are subblocks located at an edge of the current affine block.

Optionally, the plurality of subblocks are subblocks located at a left edge and/or a right edge of the current affine block.

It should be understood that, the luminance compensation block corresponding to each subblock is determined based on the motion vector of each subblock, and a quantity of finally obtained luminance compensation blocks is the same as a quantity of subblocks of the current affine block.

In this disclosure, the luminance compensation block corresponding to each subblock is determined based on the motion vector of each subblock, so that a plurality of luminance compensation blocks that better match the subblocks can be obtained, and the accuracy of the inter prediction can be improved to some extent.

In an embodiment, the first sample set includes a reconstructed sample neighboring to the left edge and/or a reconstructed sample neighboring to an upper edge of the current affine block.

In an embodiment, the second sample set includes a reconstructed sample at a specific neighboring location of each of the plurality of luminance compensation blocks. The plurality of luminance compensation blocks include a first-type luminance compensation block and/or a second-type luminance compensation block. The first-type luminance compensation block is a luminance compensation block corresponding to a subblock on the upper edge of the current affine block. The second-type luminance compensation block is a luminance compensation block corresponding to a subblock on the left edge of the current affine block. A reconstructed sample at a specific neighboring location of the first-type luminance compensation block is a reconstructed sample neighboring to an upper edge of the first-type luminance compensation block. A reconstructed sample at a specific neighboring location of the second-type luminance compensation block is a reconstructed sample neighboring to a left edge of the second-type luminance compensation block.

For ease of understanding, the plurality of luminance compensation blocks may further be spliced into one virtual luminance compensation block. A shape of the virtual luminance compensation block may be or may not be a rectangle. For example, the virtual luminance compensation block may be an irregular graphics block obtained by splicing the luminance compensation blocks.

It should be understood that the virtual luminance compensation block is not a real picture block that needs to be constructed, but may be a reference object used to determine the reconstructed sample in the second sample set.

Optionally, when the first sample set includes only the reconstructed sample neighboring to the upper edge of the current affine block, the second sample set also includes only a reconstructed sample neighboring to an upper edge of the virtual luminance compensation block.

Optionally, when the first sample set includes only the reconstructed sample neighboring to the left edge of the current affine block, the second sample set also includes only a reconstructed sample neighboring to a left edge of the virtual luminance compensation block.

Optionally, when the first sample set includes the reconstructed sample neighboring to the upper edge and the reconstructed sample neighboring to the left edge of the current affine block, the second sample set also includes a reconstructed sample neighboring to an upper edge and a reconstructed sample neighboring to a left edge of the virtual luminance compensation block.

In an embodiment, the determining one or more luminance compensation blocks based on motion vectors of one or more subblocks of the current affine block includes: determining, based on a motion vector of a subblock at a first preset location in the current affine block, a luminance compensation block corresponding to the affine block.

In this disclosure, a motion vector of a subblock at a fixed location in the current affine block is used to determine the luminance compensation block corresponding to the entire affine motion block, so that a quantity of luminance compensation blocks that need to be determined can be reduced, and complexity of determining the luminance compensation block can be reduced.

In an embodiment, the first preset location is the upper-left corner or the center of the current affine block.

The upper-left corner of the current affine block may be a location at which a leftmost and uppermost sample of the current affine block is located.

For example, for an affine block whose size is W×H, the upper-left corner of the affine block is used as a coordinate origin, coordinates of the upper-left corner of the affine block is (0), 0), and coordinates of the center of the affine block are (W/2, H/2).

Optionally, the subblock at the first preset location in the current affine block is a subblock, in the current affine block, whose upper-left corner is located at the first preset location.

It should be understood that the subblock at the first preset location in the current affine block may alternatively be a subblock, in the current affine block, whose lower-left corner, upper-right corner, or lower-right corner is located at the first preset location.

In an embodiment, the first sample set includes a reconstructed sample neighboring to a left edge and/or a reconstructed sample neighboring to an upper edge of the current affine block.

In an embodiment, the second sample set includes a reconstructed sample neighboring to a left edge and/or a reconstructed sample neighboring to an upper edge of the luminance compensation block corresponding to the affine block.

Optionally, when the first sample set includes only the reconstructed sample neighboring to the upper edge of the current affine block, the second sample set also includes only the reconstructed sample neighboring to the upper edge of the luminance compensation block corresponding to the affine block.

Optionally, when the first sample set includes only the reconstructed sample neighboring to the left edge of the current affine block, the second sample set also includes only the reconstructed sample neighboring to the left edge of the luminance compensation block corresponding to the affine block.

Optionally, when the first sample set includes the reconstructed sample neighboring to the upper edge and the reconstructed sample neighboring to the left edge of the current affine block, the second sample set also includes the reconstructed sample neighboring to the upper edge and the reconstructed sample neighboring to the left edge of the luminance compensation block corresponding to the affine block.

In an embodiment, the determining one or more luminance compensation blocks based on motion vectors of one or more subblocks of the current affine block includes: determining, based on a motion vector of a subblock at a second preset location in the current affine block, a luminance compensation block corresponding to the subblock at the second preset location.

In this disclosure, a motion vector of a subblock at a fixed location in the current affine block is used to determine a luminance compensation block corresponding to the subblock, so that a quantity of luminance compensation blocks that need to be determined can be reduced, and complexity of determining the luminance compensation block can be simplified.

Optionally, the second preset location is one or more of a left edge, an upper edge, or the upper-left corner of the current affine block.

For example, the second preset location may be the left edge, the upper edge, or the upper-left corner of the current affine block.

For another example, the second preset location may be the left edge and the upper edge of the current affine block. In this case, the second preset location includes two locations.

In an embodiment, the second preset location is the left edge and/or the upper edge of the current affine block, and the first sample set includes a reconstructed sample neighboring to a left edge and/or a reconstructed sample neighboring to an upper edge of the subblock at the second preset location.

In an embodiment, the second preset location is the left edge and/or the upper edge of the current affine block, and the second sample set includes a reconstructed sample neighboring to a left edge and/or a reconstructed sample neighboring to an upper edge of the luminance compensation block corresponding to the subblock at the second preset location.

Optionally, the second preset location is the left edge of the current affine block, the first sample set includes the reconstructed sample neighboring to the left edge of the subblock at the second preset location, and the second sample set includes the reconstructed sample neighboring to the left edge of the luminance compensation block corresponding to the subblock at the second preset location.

Optionally, the second preset location is the upper edge of the current affine block, the first sample set includes the reconstructed sample neighboring to the upper edge of the subblock at the second preset location, and the second sample set includes the reconstructed sample neighboring to the upper edge of the luminance compensation block corresponding to the subblock at the second preset location.

Optionally, the second preset location is the left edge and the upper edge of the current affine block, the first sample set includes the reconstructed sample neighboring to the left edge and the reconstructed sample neighboring to the upper edge of the subblock at the second preset location, and the second sample set includes the reconstructed sample neighboring to the left edge and the reconstructed sample neighboring to the upper edge of the luminance compensation block corresponding to the subblock at the second preset location.

In an embodiment, the second preset location is the upper-left corner of the current affine block, and the first sample set includes a reconstructed sample neighboring to a left edge and/or a reconstructed sample neighboring to an upper edge of the subblock at the second preset location.

In an embodiment, the second preset location is the upper-left corner of the current affine block, and the second sample set includes a reconstructed sample neighboring to a left edge and/or a reconstructed sample neighboring to an upper edge of the luminance compensation block corresponding to the subblock at the second preset location.

Optionally, the second preset location is the upper-left corner of the current affine block, the first sample set includes the reconstructed sample neighboring to the left edge and/or the reconstructed sample neighboring to the upper edge of the subblock at the second preset location, and the second sample set includes the reconstructed sample neighboring to the left edge and/or the reconstructed sample neighboring to the upper edge of the luminance compensation block corresponding to the subblock at the second preset location.

In an embodiment, the foregoing method is a video decoding method. Before the determining one or more luminance compensation blocks based on motion vectors of one or more subblocks of the current affine block, the method further includes: decoding a bitstream to obtain first identification information, where the first identification information is used to indicate to perform luminance compensation on the current affine block.

Optionally, a local illumination compensation (LIC) flag (flag) may be used to represent the first identification information.

The LIC technology is an inter prediction method used to compensate for a luminance difference between a current block and a reference block. In the LIC technology, a predicted value of the current block is derived according to a linear model constructed based on neighboring reconstructed samples of the current block and neighboring reconstructed samples of the reference block.

Optionally, the LIC flag being 1 indicates the first identification information, and indicates that luminance compensation should be performed on the current affine block.

Optionally, the LIC flag being 0 indicates second identification information, and indicates that luminance compensation does not need to be performed on the current affine block.

When the foregoing method is a decoding method, if the second identification information is obtained by decoding the bitstream, it is determined that luminance compensation does not need to be performed on the current affine block, and an inter prediction process is completed after the predicted sample value of the current affine block is obtained.

In an embodiment, the method is a video encoding method. The method further includes: generating first identification information, where the first identification information is used to indicate that luminance compensation should be performed on the current affine block; and encoding the first identification information to generate a bitstream.

In this disclosure, the first identification information is encoded, so that a decoder side can obtain the first identification information through decoding in a decoding process, and then perform luminance compensation on the affine block in an inter prediction process.

With reference to the first aspect, in some implementations of the first aspect, the updated predicted sample value of the current affine block is obtained according to the following formula: $pred\_c(i, j) = \alpha \times rec\_c(i, j) + \beta$.

$pred\_c(i, j)$ is an updated predicted sample value at a location $(i, j)$ in the current affine block, $rec\_c(i, j)$ is a predicted sample value at the location $(i, j)$ in the current affine block, and $\alpha$ and $\beta$ are linear model coefficients.

In an embodiment, including several functional units configured to implement any method in the first aspect.

According to an embodiment, an inter prediction apparatus is provided. The inter prediction apparatus includes: a prediction unit, configured to obtain a predicted sample value of a current affine block: a processing unit, where the processing unit is configured to: determine one or more luminance compensation blocks based on motion vectors of one or more subblocks of the current affine block, and determine a linear model coefficient based on a first sample set and a second sample set, where the first sample set includes at least one reconstructed sample neighboring to an edge of the current affine block, the second sample set includes at least one reconstructed sample neighboring to an edge of the one or more luminance compensation blocks, and the sample in the first sample set is in a one-to-one correspondence with the sample in the second sample set; and an update unit, configured to update the predicted sample value of the current affine block based on the linear model coefficient, to obtain an updated predicted sample value of the current affine block.

In an embodiment, the processing unit is configured to determine, based on the motion vector of each of the plurality of subblocks of the current affine block, a luminance compensation block corresponding to each subblock, to obtain the plurality of luminance compensation blocks.

In an embodiment, the first sample set includes a reconstructed sample neighboring to a left edge and/or a reconstructed sample neighboring to an upper edge of the current affine block.

In an embodiment, the second sample set includes a reconstructed sample at a specific neighboring location of each of the plurality of luminance compensation blocks. The plurality of luminance compensation blocks include a first-type luminance compensation block and/or a second-type luminance compensation block. The first-type luminance compensation block is a luminance compensation block corresponding to a subblock on the upper edge of the current affine block. The second-type luminance compensation block is a luminance compensation block corresponding to a subblock on the left edge of the current affine block. A reconstructed sample at a specific neighboring location of the first-type luminance compensation block is a reconstructed sample neighboring to an upper edge of the first-type luminance compensation block. A reconstructed sample at a specific neighboring location of the second-type luminance compensation block is a reconstructed sample neighboring to a left edge of the second-type luminance compensation block.

In an embodiment, the processing unit is configured to determine, based on a motion vector of a subblock at a first preset location in the current affine block, a luminance compensation block corresponding to the current affine block.

In an embodiment, the first preset location is the upper-left corner or the center of the current affine block.

In an embodiment, the first sample set includes a reconstructed sample neighboring to a left edge and/or a reconstructed sample neighboring to an upper edge of the current affine block, and the second sample set includes a reconstructed sample neighboring to a left edge and/or a reconstructed sample neighboring to an upper edge of the luminance compensation block corresponding to the current affine block.

In an embodiment, the processing unit is configured to determine, based on a motion vector of a subblock at a second preset location in the current affine block, a luminance compensation block corresponding to the subblock at the second preset location.

In an embodiment, the second preset location is a left edge and/or an upper edge of the current affine block, the first sample set includes a reconstructed sample neighboring to a left edge and/or a reconstructed sample neighboring to an upper edge of the subblock at the second preset location, and the second sample set includes a reconstructed sample neighboring to a left edge and/or a reconstructed sample neighboring to an upper edge of the luminance compensation block corresponding to the subblock at the second preset location.

In an embodiment, the second preset location is the upper-left corner of the current affine block, the first sample set includes a reconstructed sample neighboring to a left edge and/or a reconstructed sample neighboring to an upper edge of the subblock at the second preset location, and the second sample set includes a reconstructed sample neighboring to a left edge and/or a reconstructed sample neighboring to an upper edge of the luminance compensation block corresponding to the subblock at the second preset location.

In an embodiment, the apparatus is a video decoding apparatus. The apparatus further includes: a decoding unit, configured to decode a bitstream to obtain first identification information, where the first identification information is used to indicate to perform luminance compensation on the current affine block.

Optionally, before the predicted sample value of the current affine block is updated based on the linear model coefficient, the decoding unit decodes the bitstream to obtain the first identification information.

In an embodiment, the updated predicted sample value of the current affine block is obtained according to the following formula: $pred\_c(i, j) = \alpha \times rec\_c(i, j) + \beta$.

$pred\_c(i, j)$ is an updated predicted sample value at a location $(i, j)$ in the current affine block, $rec\_c(i, j)$ is a predicted sample value at the location $(i, j)$ in the current affine block, and $\alpha$ and $\beta$ are linear model coefficients.

In an embodiment, a video data decoding device is provided, and the device includes:
 a memory, configured to store video data in a form of a bitstream; and
 a video decoder, configured to implement some or all operations of any method according to one or more embodiments described herein.

In an embodiment, a video data encoding device is provided, and the device includes:
 a memory, configured to store video data in a form of a bitstream; and
 a video encoder, configured to implement some or all operations of any method according to one or more embodiments described herein.

An embodiment of this disclosure provides a video data decoding device, including a memory and a processor. The processor invokes program code stored in the memory, to perform some or all operations of any method according to one or more embodiments described herein.

Optionally, the memory is a non-volatile memory.

Optionally, the memory and the processor are coupled to each other.

An embodiment of this disclosure provides a computer-readable storage medium. The computer-readable storage medium stores program code, and the program code includes instructions used to perform some or all operations of any method according to the one or more embodiments described herein.

An embodiment of this disclosure provides a computer program product. When the computer program product runs on a computer, the computer is enabled to perform some or all operations of any method according to the one or more embodiments described herein.

It should be understood that, the technical solutions in one embodiment of this disclosure may be consistent with the technical solution in one or more other embodiments. Beneficial effects achieved in the various embodiments and corresponding feasible implementations are similar, and details are not described again.

DESCRIPTION OF EMBODIMENTS

Figure 1:
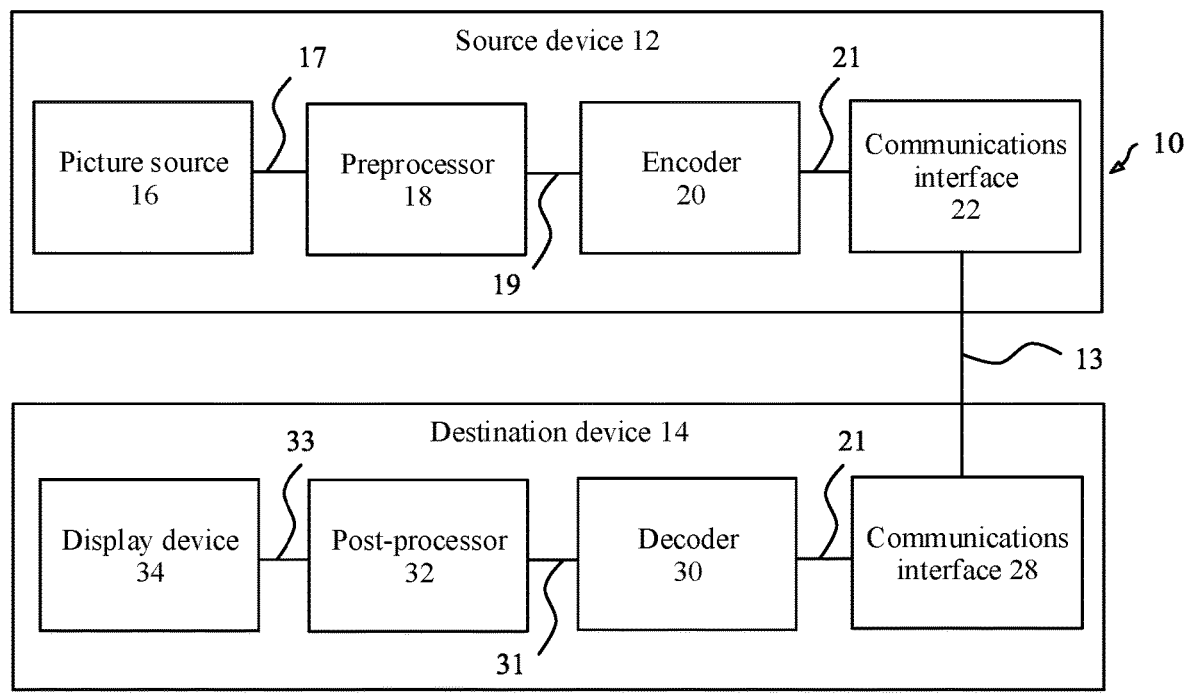
FIG. 1 is a schematic block diagram of an example of a video coding system used to implement an embodiment of this disclosure.

The following describes the embodiments of this disclosure with reference to the accompanying drawings.

In the following description, reference is made to the accompanying drawings that form a part of this disclosure and show; by way of illustration, specific aspects of the embodiments of this disclosure or specific aspects in which the embodiments of this disclosure may be used. It should be understood that the embodiments of this disclosure may further be used in another aspect, and may include structural or logical changes not depicted in the accompanying drawings. Therefore, the following detailed description shall not be taken in a limiting sense, and the scope of this disclosure should be defined by the appended claims.

For example, it should be understood that a disclosure in connection with a described method may also hold true for a corresponding device or system configured to perform the method and vice versa.

For another example, if one or more specific method operations are described, a corresponding device may include one or more units such as functional units, to perform the described one or more method operations (for example, one unit performing the one or more operations: or a plurality of units each performing one or more of the plurality of operations), even if such one or more units are not explicitly described or illustrated in the accompanying drawings.

In addition, if a specific apparatus is described based on one or more units such as functional units, a corresponding method may include one operation used to perform a function of one or more units (for example, one operation used to perform the function of the one or more units, or a plurality of operations each used to perform the function of one or more of the plurality of units), even if such one or more operations are not explicitly described or illustrated in the accompanying drawings. Further, it should be understood that features of the various example embodiments and/or aspects described in this specification may be combined with each other, unless specifically noted otherwise.

The technical solutions in the embodiments of this disclosure may not only be applied to existing video coding standards (for example, standards such as H.264 and HEVC), but also be applied to future video coding standards (for example, the H.266 standard). Terms used in implementations of this disclosure are merely intended to explain specific embodiments of this disclosure, and are not intended to limit this disclosure. The following first briefly describes some concepts that may be used in the embodiments of this disclosure.

Video coding typically refers to processing of a sequence of pictures that constitute a video or a video sequence. In the video coding field, the terms "picture", "frame", and "image" may be used as synonyms. Video coding in this specification refers to video encoding or video decoding. Video encoding is performed on a source side, and usually includes processing (for example, through compression) an original video picture to reduce an amount of data for representing the video picture, for more efficient storage and/or transmission. Video decoding is performed on a destination side, and usually includes inverse processing relative to an encoder to reconstruct the video picture. "Coding" of a video picture in the embodiments should be understood as "encoding" or "decoding" of a video sequence. A combination of an encoding part and a decoding part is also referred to as coding (encoding and decoding).

A video sequence includes a series of pictures (picture), the picture is further split into slices (slice), and the slice is further split into blocks (block). Video coding is performed by block. In some new video coding standards, the concept "block" is further extended. For example, a macroblock (MB) is introduced to the H.264 standard. The macroblock may further be split into a plurality of prediction blocks (partition) that can be used for predictive coding. In the high efficiency video coding (HEVC) standard, basic concepts such as a "coding unit" (CU), a "prediction unit" (PU), and a "transform unit" (TU) are used, a plurality of block units are obtained through functional division, and a brand-new tree-based structure is used for description. For example, a CU may be split into smaller CUs through quadtree split, and the smaller CU may further be split, to generate a quadtree structure. The CU is a basic unit for splitting and encoding a coding picture. A PU and a TU also have similar tree structures. The PU may correspond to a prediction block, and is a basic unit for predictive coding. The CU is further split into a plurality of PUs based on a splitting pattern. The TU may correspond to a transform block, and is a basic unit for transforming a prediction residual. However, in essence, all of the CU, the PU, and the TU are conceptually blocks (or referred to as picture blocks).

For example, in HEVC, a CTU is split into a plurality of CUs by using a quadtree structure represented as a coding tree. A decision on whether to encode a picture region through inter (temporal) or intra (spatial) prediction is made at a CU level. Each CU may further be split into one, two, or four PUs based on a PU splitting pattern. In one PU, a same prediction process is applied, and related information is transmitted to a decoder on a PU basis. After obtaining a residual block by applying the prediction process based on the PU splitting pattern, the CU may be partitioned into transform units (TU) based on another quadtree structure similar to the coding tree used for the CU. In the recent development of video compression technologies, a quad-tree and binary tree (QTBT) partition frame is used to partition a coding block. In a QTBT block structure, the CU may be square or rectangular.

In this specification, for ease of description and understanding, a to-be-coded picture block in a current coded picture may be referred to as a current block. For example, in encoding, the current block is a block that is being encoded, and in decoding, the current block is a block that is being decoded. A decoded picture block, in a reference picture, used to predict the current block is referred to as a reference block. To be specific, the reference block is a block that provides a reference signal for the current block, and the reference signal represents a sample value in the picture block. A block that is in the reference picture and that provides a prediction signal for the current block may be referred to as a prediction block. The prediction signal represents a sample value, a sampling value, or a sampling signal in the prediction block. For example, after a plurality of reference blocks are traversed, an optimal reference block is found. The optimal reference block provides prediction for the current block, and this block is referred to as a prediction block.

In a case of lossless video coding, an original video picture may be reconstructed. In other words, a reconstructed video picture has same quality as the original video picture (assuming that no transmission loss or other data loss occurs during storage or transmission). In a case of lossy video coding, further compression is performed through, for example, quantization, to reduce an amount of data for representing a video picture, but the video picture cannot be reconstructed on a decoder side. To be specific, quality of a reconstructed video picture is lower or poorer than that of the original video picture.

Several H.261 video coding standards are for "lossy hybrid video coding" (to be specific, spatial and temporal prediction in a sample domain is combined with 2D transform coding for applying quantization in a transform domain). Each picture of a video sequence is usually partitioned into a set of non-overlapping blocks, and coding is usually performed at a block level. To be specific, on an encoder side, a video is usually processed, that is, encoded, at a block (video block) level. For example, a prediction block is generated through spatial (intra) prediction and temporal (inter) prediction, the prediction block is subtracted from a current block (a block being processed or to be processed) to obtain a residual block, and the residual block is transformed in the transform domain and quantized to reduce an amount of data that is to be transmitted (compressed). On a decoder side, an inverse processing part relative to an encoder is applied to an encoded block or a compressed block to reconstruct the current block for representation. Furthermore, the encoder duplicates a processing loop of the decoder, so that the encoder and the decoder generate same prediction (for example, intra prediction and inter prediction) and/or reconstruction for processing, that is, coding, a subsequent block.

The following describes a system architecture used in the embodiments of this disclosure. FIG. 1 is a schematic block diagram of an example of a video encoding and decoding system 10 according to an embodiment of this disclosure. As shown in FIG. 1, the video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various implementation solutions, the source apparatus 12, the destination apparatus 14, or both the source apparatus 12 and the destination apparatus 14 may include one or more processors and a memory coupled to the one or more processors. The memory may include but is not limited to a read-only memory (ROM), a random access memory (RAM), an erasable programmable read-only memory (EPROM), a flash memory, or any other medium that may be configured to store required program code in a form of an instruction or a data structure and that can be accessed by a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a so-called "smart" phone, a television, a camera, a display apparatus, a digital media player, a video game console, a vehicle-mounted computer, a wireless communications device, or the like.

Although FIG. 1 depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented over a link 13, and the destination device 14 may receive encoded video data from the source device 12 over the link 13. The link 13 may include one or more media or apparatuses capable of moving the encoded video data from the source device 12 to the destination device 14. In an example, the link 13 may include one or more communication media that enable the source device 12 to directly transmit the encoded video data to the destination device 14 in real time. In this example, the source device 12 may modulate the encoded video data according to a communications standard (for example, a wireless communications protocol), and may transmit modulated video data to the destination device 14. The one or more communications media may include a wireless communications medium and/or a wired communications medium, for example, a radio frequency (RF) spectrum or one or more physical transmission cables. The one or more communications media may be a part of a packet-based network, and the packet-based network is, for example, a local area network, a wide area network, or a global network (for example, the internet). The one or more communications media may include a router, a switch, a base station, or another device that facilitates communication from the source device 12 to the destination device 14.

The source device 12 includes an encoder 20. Optionally, the source device 12 may further include a picture source 16, a picture preprocessor 18, and a communications interface 22. In a specific implementation, the encoder 20, the picture source 16, the picture preprocessor 18, and the communications interface 22 may be hardware components in the source device 12, or may be software programs in the source device 12. Descriptions are separately provided as follows:

The picture source 16 may include or be any type of picture capturing device configured to, for example, capture a real-world picture: and/or any type of device for generating a picture or comment (for screen content encoding, some text on a screen is also considered as a part of a to-be-encoded picture or image), for example, a computer graphics processor configured to generate a computer animation picture: or any type of device configured to obtain and/or provide a real-world picture or a computer animation picture (for example, screen content or a virtual reality (VR) picture), and/or any combination thereof (for example, an augmented reality (AR) picture). The picture source 16 may be a camera configured to capture a picture or a memory configured to store a picture. The picture source 16 may further include any type of (internal or external) interface through which a previously captured or generated picture is stored and/or a picture is obtained or received. When the picture source 16 is a camera, the picture source 16 may be, for example, a local camera or an integrated camera integrated into the source device. When the picture source 16 is a memory, the picture source 16 may be a local memory or, for example, an integrated memory integrated into the source device. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processor, a computer, or a server. The interface may be any type of interface, for example, a wired or wireless interface or an optical interface, according to any proprietary or standardized interface protocol.

A picture may be considered as a two-dimensional array or matrix of picture elements (picture element). The picture element in the array may also be referred to as a sample. Quantities of samples in horizontal and vertical directions (or axes) of the array or the picture define a size and/or resolution of the picture. For representation of a color, typically three color components are used. To be specific, the picture may be represented as or include three sample arrays. For example, in an RBG format or color space, the picture includes corresponding red, green, and blue sample arrays. However, in video coding, each sample is typically represented in a luminance/chrominance format or a color space. For example, a picture in a YUV format includes a luminance component indicated by Y (sometimes L is used instead) and two chrominance components indicated by U and V. The luminance (luma) component Y represents brightness or gray level intensity (for example, both are the same in a gray-scale picture), and the two chrominance (chroma) components U and V represent chrominance or color information components. Correspondingly, the picture in the YUV format includes a luminance sample array of luminance sample values (Y) and two chrominance sample arrays of chrominance values (U and V). A picture in an RGB format may be converted or transformed into a picture in the YUV format and vice versa, and such a process is also known as color transformation or conversion. If a picture is monochrome, the picture may include only a luminance sample array. In this embodiment of this disclosure, a picture transmitted by the picture source 16 to a picture processor may also be referred to as original picture data 17.

The picture preprocessor 18 is configured to receive the original picture data 17 and perform preprocessing on the original picture data 17 to obtain a preprocessed picture 19 or preprocessed picture data 19. For example, the preprocessing performed by the picture preprocessor 18 may include trimming, color format conversion (for example, from an RGB format to a YUV format), color correction, or de-noising.

The encoder 20 (also referred to as a video encoder 20) is configured to receive the preprocessed picture data 19, and process the preprocessed picture data 19 in a related prediction mode (such as a prediction mode in the embodiments of this specification), to provide encoded picture data 21 (structural details of the encoder 20 are further described below based on FIG. 2, FIG. 4, or FIG. 5). In some embodiments, the encoder 20 may be configured to perform the embodiments described below; to implement application of the inter prediction method on the encoder side described in this disclosure.

The communications interface 22 may be configured to receive the encoded picture data 21, and transmit the encoded picture data 21 to the destination device 14 or any other device (for example, a memory) over the link 13 for storage or direct reconstruction. The other device may be any device used for decoding or storage. The communications interface 22 may be, for example, configured to package the encoded picture data 21 in an appropriate format, for example, into a data packet for transmission over the link 13.

The destination device 14 includes a decoder 30. Optionally, the destination device 14 may further include a communications interface 28, a picture post-processor 32, and a display device 34. Descriptions are separately provided as follows:

The communications interface 28 may be configured to receive the encoded picture data 21 from the source device 12 or any other source. The any other source is, for example, a storage device. The storage device is, for example, an encoded picture data storage device. The communications interface 28 may be configured to transmit or receive the encoded picture data 21 over the link 13 between the source device 12 and the destination device 14 or over any type of network. The link 13 is, for example, a direct wired or wireless connection. The any type of network is, for example, a wired or wireless network or any combination thereof, or any type of private or public network or any combination thereof. The communications interface 28 may be, for example, configured to depackage the data packet transmitted through the communications interface 22, to obtain the encoded picture data 21.

Both the communications interface 28 and the communications interface 22 may be configured as unidirectional communications interfaces or bidirectional communications interfaces, and may be configured to, for example, send and receive messages to establish a connection, and acknowledge and exchange any other information related to a communication link and/or data transmission such as encoded picture data transmission.

The decoder 30 (also referred to as the decoder 30) is configured to receive the encoded picture data 21 and provide decoded picture data 31 or a decoded picture 31 (structural details of the decoder 30 are further described below based on FIG. 3, FIG. 4, or FIG. 5). In some embodiments, the decoder 30 may be configured to perform the embodiments described below, to implement application of the inter prediction method on the decoder side described in this disclosure.

The picture post-processor 32 is configured to post-process the decoded picture data 31 (also referred to as reconstructed picture data) to obtain post-processed picture data 33. The post-processing performed by the picture post-processor 32 may include color format conversion (for example, from a YUV format to an RGB format), color correction, trimming, re-sampling, or any other processing. The picture post-processor 32 may further be configured to transmit the post-processed picture data 33 to the display device 34.

The display device 34 is configured to receive the post-processed picture data 33 to display a picture to, for example, a user or a viewer. The display device 34 may be or may include any type of display for presenting a reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any types of other displays.

Although FIG. 1 depicts the source device 12 and the destination device 14 as separate devices, a device embodiment may alternatively include both the source device 12 and the destination device 14 or the functionalities of both the source device 12 and the destination device 14, that is, the source device 12 or the corresponding functionality and the destination device 14 or the corresponding functionality. In such an embodiment, the source device 12 or the corresponding functionality and the destination device 14 or the corresponding functionality may be implemented by using same hardware and/or software, separate hardware and/or software, or any combination thereof.

Based on the descriptions, a person skilled in the art can definitely learn that existence and (exact) division of functionalities of different units or functionalities of the source device 12 and/or the destination device 14 shown in FIG. 1 may vary depending on an actual device and application. The source device 12 and the destination device 14 may include any of a wide range of devices, including any type of handheld or stationary device, for example, a notebook or laptop computer, a mobile phone, a smartphone, a tablet or a tablet computer, a video camera, a desktop computer, a set-top box, a television, a camera, a vehicle-mounted device, a display device, a digital media player, a video game console, a video streaming device (such as a content service server or a content delivery server), a broadcast receiver device, or a broadcast transmitter device, and may use or not use any type of operating system.

The encoder 20 and the decoder 30 each may be implemented as any one of various appropriate circuits, for example, one or more microprocessors, digital signal processors (DSP), application-specific integrated circuits (ASIC), field-programmable gate arrays (FPGA), discrete logic, hardware, or any combinations thereof. If the technologies are implemented partially by using software, a device may store software instructions in a suitable non-transitory computer-readable storage medium and may execute the instructions by using hardware such as one or more processors, to perform the technologies of this specification. Any of the foregoing content (including hardware, software, a combination of hardware and software, and the like) may be considered as one or more processors.

In some cases, the video encoding and decoding system 10 shown in FIG. 1 is merely an example, and the technologies of this disclosure are applicable to video coding settings (for example, video encoding or video decoding) that do not necessarily include any data communication between an encoding device and a decoding device. In another example, data may be retrieved from a local memory, streamed over a network, or the like. A video encoding device may encode data and store the data into a memory, and/or a video decoding device may retrieve data from the memory and decode the data. In some examples, the encoding and the decoding are performed by devices that do not communicate with one another, but simply encode data to the memory and/or retrieve and decode data from the memory.

Figure 2:
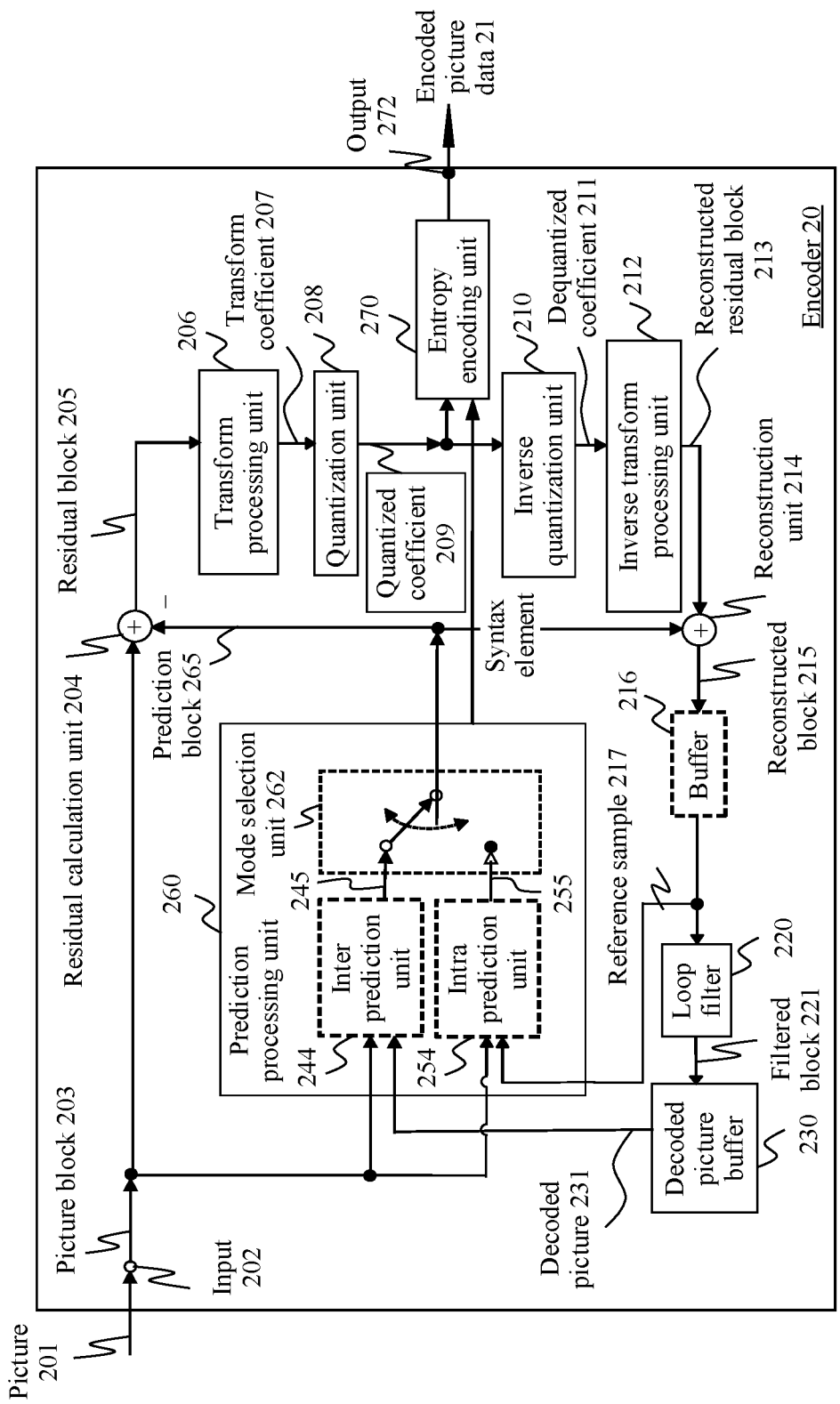
FIG. 2 is a schematic structural block diagram of an example of a video encoder used to implement an embodiment of this disclosure.

FIG. 2 is a schematic/conceptual block diagram of an example of an encoder 20 according to an embodiment of this disclosure. In the example of FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the figure). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, and the prediction processing unit 260 form a backward signal path of the encoder. The backward signal path of the encoder corresponds to a signal path of a decoder (refer to a decoder 30 in FIG. 3).

The encoder 20 receives, for example, via an input 202, a picture 201 or a picture block 203 of the picture 201, for example, a picture in a sequence of pictures forming a video or a video sequence. The picture block 203 may also be referred to as a current picture block or a to-be-encoded picture block, and the picture 201 may be referred to as a current picture or a to-be-encoded picture (particularly in video coding, for distinguishing the current picture from other pictures, for example, previously encoded and/or decoded pictures in a same video sequence, namely, the video sequence that also includes the current picture).

An embodiment of the encoder 20 may include a partitioning unit (not shown in FIG. 2), configured to partition the picture 201 into a plurality of blocks such as the picture block 203. The picture 201 is usually partitioned into a plurality of non-overlapping blocks. The partitioning unit may be configured to use a same block size for all pictures in a video sequence and a corresponding grid defining the block size, or change a block size between pictures or subsets or groups of pictures, and partition each picture into corresponding blocks.

In an example, the prediction processing unit 260 of the encoder 20 may be configured to perform any combination of the partitioning technologies described above.

Like the picture 201, the picture block 203 is also or may be considered as a two-dimensional array or matrix of samples with sample values, although a size of the picture block 203 is smaller than a size of the picture 201. In other words, the picture block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. Quantities of samples in horizontal and vertical directions (or axes) of the picture block 203 define a size of the picture block 203.

The encoder 20 shown in FIG. 2 is configured to encode the picture 201 block by block, for example, perform encoding and prediction on each picture block 203.

The residual calculation unit 204 is configured to calculate a residual block 205 based on the picture block 203 and a prediction block 265 (other details about the prediction block 265 are provided below), for example, by subtracting sample values of the prediction block 265 from sample values of the picture block 203 sample by sample (pixel by pixel), to obtain the residual block 205 in a sample domain.

The transform processing unit 206 is configured to apply a transform, for example, a discrete cosine transform (DCT) or a discrete sine transform (DST), to sample values of the residual block 205 to obtain transform coefficients 207 in a transform domain. The transform coefficient 207 may also be referred to as a transform residual coefficient and represents the residual block 205 in the transform domain.

The transform processing unit 206 may be configured to apply integer approximations of DCT/DST, such as transforms specified in HEVC/H.265. In comparison with an orthogonal DCT transform, such an integer approximation is typically scaled by a factor. To preserve a norm of a residual block which is processed by using forward and inverse transforms, applying an additional scale factor is a part of a transform process. The scaling factor is usually selected based on some constraints. For example, the scaling factor is a power of two for a shift operation, a bit depth of the transform coefficient, and a tradeoff between accuracy and implementation costs. For example, a specific scaling factor is specified for the inverse transform by, for example, the inverse transform processing unit 212 on the decoder side 30 (and a corresponding inverse transform by, for example, the inverse transform processing unit 212 on the encoder 20 side), and correspondingly, a corresponding scaling factor may be specified for the forward transform by the transform processing unit 206 on the encoder 20 side.

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209. A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step corresponds to finer quantization, and a larger quantization step corresponds to coarser quantization. An appropriate quantization step may be indicated by a quantization parameter (QP). For example, the quantization parameter may be an index to a predefined set of appropriate quantization steps. For example, a smaller quantization parameter may correspond to finer quantization (a smaller quantization step), and a larger quantization parameter may correspond to coarser quantization (a larger quantization step), or vice versa. The quantization may include division by a quantization step and corresponding quantization or inverse quantization, for example, performed by the inverse quantization unit 210, or may include multiplication by a quantization step. In embodiments according to some standards such as HEVC, a quantization parameter may be used to determine the quantization step. Generally, the quantization step may be calculated based on a quantization parameter by using a fixed point approximation of an equation including division. An additional scaling factor may be introduced for quantization and dequantization to restore the norm of the residual block, where the norm of the residual block may be modified because of a scale used in the fixed point approximation of the equation for the quantization step and the quantization parameter. In an example implementation, scales of the inverse transform and the dequantization may be combined. Alternatively, a customized quantization table may be used and signaled from the encoder to the decoder, for example, in a bitstream. The quantization is a lossy operation, where a loss increases with an increasing quantization step.

The inverse quantization unit 210 is configured to apply the inverse quantization of the quantization unit 208 to a quantized coefficient to obtain a dequantized coefficient 211, for example, apply, based on or by using a same quantization step as the quantization unit 208, the inverse of a quantization scheme applied by the quantization unit 208. The dequantized coefficient 211 may also be referred to as a dequantized residual coefficient 211, and correspond to the transform coefficient 207, although usually different from the transform coefficient due to a loss caused by quantization.

The inverse transform processing unit 212 is configured to apply an inverse transform of the transform applied by the transform processing unit 206, for example, an inverse discrete cosine transform (DCT) or an inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (for example, a summer 214) is configured to add the inverse transform block 213 (namely, a reconstructed residual block 213) to the prediction block 265 to obtain a reconstructed block 215 in a sample domain, for example, by adding a sample value of the reconstructed residual block 213 and the sample value of the prediction block 265.

Optionally, a buffer unit 216 (or briefly referred to as a "buffer" 216) of, for example, the line buffer 216, is configured to buffer or store the reconstructed block 215 and a corresponding sample value, for example, for intra prediction. In another embodiment, the encoder may be configured to use unfiltered reconstructed blocks and/or corresponding sample values stored in the buffer unit 216 for any type of estimation and/or prediction, for example, intra prediction.

For example, in an embodiment, the encoder 20 may be configured so that the buffer unit 216 is configured to store not only the reconstructed block 215 used for the intra prediction unit 254 but also a reconstructed block (not shown in FIG. 2) used for the loop filter unit 220 and/or so that, for example, the buffer unit 216 and the decoded picture buffer 230 form one buffer. In another embodiment, a filtered block 221 and/or a block or sample (not shown in FIG. 2) from the decoded picture buffer 230 are/is used as an input or a basis for the intra prediction unit 254. The loop filter unit 220 (or briefly referred to as a "loop filter" 220) is configured to filter the reconstructed block 215 to obtain the filtered block 221, to smooth sample transition or improve video quality. The loop filter unit 220 is intended to represent one or more loop filters including, for example, a deblocking filter, a sample-adaptive offset (SAO) filter, or another filter, for example, a bilateral filter, an adaptive loop filter (ALF), a sharpening or smoothing filter, or a collaborative filter. Although the loop filter unit 220 is shown as an in-loop filter in FIG. 2, in another configuration, the loop filter unit 220 may be implemented as a post-loop filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (for example, sample adaptive offset information), for example, directly or after entropy encoding performed by the entropy encoding unit 270 or any other entropy encoding unit, so that, for example, the decoder 30 can receive and apply the same loop filter parameter for decoding.

The decoded picture buffer (DPB) 230 may be a reference picture memory that stores reference picture data for use in encoding video data by the encoder 20. The DPB 230 may be formed by any one of a variety of memory devices such as a dynamic random access memory (DRAM) (including a synchronous DRAM (SDRAM), a magnetoresistive RAM (MRAM), and a resistive RAM (RRAM)), or another type of memory device. The DPB 230 and the buffer 216 may be provided by a same memory device or separate memory devices. In an example, the decoded picture buffer (DPB) 230 is configured to store the filtered block 221. The decoded picture buffer 230 may further be configured to store another previously filtered block, for example, a previously reconstructed and filtered block 221, of the same current picture or of a different picture, for example, a previously reconstructed picture, and may provide a complete previously reconstructed, that is, decoded picture (and a corresponding reference block and sample) and/or a partially reconstructed current picture (and a corresponding reference block and sample), for example, for inter prediction. In an example, if the reconstructed block 215 is reconstructed without in-loop filtering, the decoded picture buffer (DPB) 230 is configured to store the reconstructed block 215.

The prediction processing unit 260, also referred to as a block prediction processing unit 260, is configured to receive or obtain the picture block 203 (a current picture block 203 of the current picture 201) and reconstructed picture data, for example, reference samples of the same (current) picture from the buffer 216 and/or reference picture data 231 of one or more previously decoded pictures from the decoded picture buffer 230, and to process such data for prediction, that is, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260), where the prediction mode provides a best match or a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate distortion optimization (RDO), that is, select a prediction mode that provides minimum rate-distortion optimization or select a prediction mode for which related rate distortion at least satisfies a prediction mode selection criterion.

The following describes in detail prediction processing performed (for example, by the prediction processing unit 260) and mode selection performed (for example, by the mode selection unit 262) by an example of the encoder 20.

As described above, the encoder 20 is configured to determine or select an optimal or optimum prediction mode from a set of (predetermined) prediction modes. The set of prediction modes may include, for example, an intra prediction mode and/or an inter prediction mode.

A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development.

In a possible implementation, a set of inter prediction modes depends on available reference pictures (namely, for example, at least some decoded pictures stored in the DBP 230, as described above) and other inter prediction parameters, for example, depends on whether an entire reference picture or only a part of the reference picture, for example, a search window area around an area of the current block, is used to search for a best matching reference block, and/or for example, depends on whether sample interpolation such as half-pel and/or quarter-pel interpolation is applied. The set of inter prediction modes may include, for example, an advanced motion vector prediction (AMVP) mode and a merge (merge) mode. In a specific implementation, the set of inter prediction modes may include an improved control point-based AMVP mode and an improved control point-based merge mode in the embodiments of this disclosure. In an example, the intra prediction unit 254 may be configured to perform any combination of inter prediction technologies described below.

In addition to the foregoing prediction modes, a skip mode and/or a direct mode may also be used in the embodiments of this disclosure.

The prediction processing unit 260 may further be configured to partition the picture block 203 into smaller block partitions or subblocks, for example, by iteratively using quadtree (QT) partitioning, binary tree (BT) partitioning, triple tree (TT) partitioning, or any combination thereof, and perform, for example, prediction on each of the block partitions or subblocks. Mode selection includes selection of a tree structure of the partitioned picture block 203 and selection of a prediction mode applied to each of the block partitions or subblocks.

The inter prediction unit 244 may include a motion estimation (ME) unit (not shown in FIG. 2) and a motion compensation (MC) unit (not shown in FIG. 2). The motion estimation unit is configured to receive or obtain the picture block 203 (the current picture block 203 of the current picture 201) and a decoded picture 231, or at least one or more previously reconstructed blocks, for example, one or more reconstructed blocks of other/different previously decoded pictures 231, for motion estimation. For example, a video sequence may include the current picture and a previously decoded picture 31, or in other words, the current picture and the previously decoded picture 31 may be a part of or form a sequence of pictures forming the video sequence.

For example, the encoder 20 may be configured to select a reference block from a plurality of reference blocks of a same picture or different pictures in a plurality of other pictures and provide, for the motion estimation unit (not shown in FIG. 2), a reference picture and/or provide an offset (a spatial offset) between a position (coordinates X and Y) of the reference block and a position of the current block as an inter prediction parameter. The offset is also referred to as a motion vector (MV).

The motion compensation unit is configured to obtain the inter prediction parameter, and perform inter prediction based on or by using the inter prediction parameter, to obtain the inter prediction block 245. Motion compensation performed by the motion compensation unit (not shown in FIG. 2) may include fetching or generating the prediction block based on a motion/block vector determined through motion estimation (possibly performing interpolation in sub-pixel precision). Interpolation filtering may generate an additional pixel sample from a known pixel sample. This potentially increases a quantity of candidate prediction blocks that may be used to encode a picture block. Upon receiving a motion vector for a PU of the current picture block, a motion compensation unit 246 may locate a prediction block to which the motion vector points in one reference picture list. The motion compensation unit 246 may further generate syntax elements associated with a block and a video slice, for decoding a picture block in the video slice by the decoder 30.

Specifically, the inter prediction unit 244 may transmit the syntax elements to the entropy encoding unit 270. The syntax elements include the inter prediction parameter (such as indication information of selection of an inter prediction mode used for prediction of the current block after traversal of a plurality of inter prediction modes). In a possible application scenario, if there is only one inter prediction mode, the inter prediction parameter may alternatively not be carried in the syntax element. In this case, the decoder side 30 may directly perform decoding by using a default prediction mode. It may be understood that the inter prediction unit 244 may be configured to perform any combination of inter prediction technologies.

The intra prediction unit 254 is configured to obtain, for example, receive, the picture block 203 (the current picture block) and one or more previously reconstructed blocks, for example, reconstructed neighboring blocks, of a same picture for intra estimation. For example, the encoder 20 may be configured to select an intra prediction mode from a plurality of (predetermined) intra prediction modes.

In an embodiment, the encoder 20 may be configured to select the intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter in the selected intra prediction mode. In any case, after selecting an intra-prediction mode for a block, the intra prediction unit 254 is further configured to provide an intra prediction parameter, namely, information indicating the selected intra-prediction mode for the block, to the entropy encoding unit 270. In an example, the intra prediction unit 254 may be configured to perform any combination of intra prediction technologies.

Specifically, the intra prediction unit 254 may transmit syntax elements to the entropy encoding unit 270. The syntax elements include the intra prediction parameter (such as indication information of selection of an intra prediction mode used for prediction of the current block after traversal of a plurality of intra prediction modes). In a possible application scenario, if there is only one intra prediction mode, the intra prediction parameter may alternatively not be carried in the syntax element. In this case, the decoder side 30 may directly perform decoding in a default prediction mode.

The entropy encoding unit 270 is configured to apply (or not apply) an entropy encoding algorithm or scheme (for example, a variable-length coding (VLC) scheme, a context adaptive VLC (CAVLC) scheme, an arithmetic coding scheme, a context adaptive binary arithmetic coding (CABAC) scheme, a syntax-based context-adaptive binary arithmetic coding (SBAC) scheme, a probability interval partitioning entropy (PIPE) coding scheme, or another entropy encoding methodology or technology) to one or all of the quantized residual coefficient 209, the inter prediction parameter, the intra prediction parameter, and/or the loop filter parameter, to obtain encoded picture data 21 that may be output via an output 272, for example, in a form of an encoded bitstream 21. The encoded bitstream may be transmitted to the video decoder 30, or archived for later transmission or retrieval by the video decoder 30. The entropy encoding unit 270 may further be configured to entropy encode another syntax element for a current video slice being encoded.

Another structural variant of the video encoder 20 can be used to encode a video stream. For example, a non-transform based encoder 20 may directly quantize a residual signal without the transform processing unit 206 for some blocks or frames. In another implementation, the encoder 20 may have the quantization unit 208 and the inverse quantization unit 210 that are combined into a single unit.

Specifically, in this embodiment of this disclosure, the encoder 20 may be configured to implement a video encoding method described in the following embodiments.

It should be understood that the video encoder in this disclosure may include only some modules in the video encoder 20. For example, the video encoder in this disclosure may include a picture decoding unit and a partitioning unit. The picture decoding unit may include one or more of an entropy decoding unit, a prediction unit, an inverse transform unit, and an inverse quantization unit.

In addition, another structural variant of the video encoder 20 can be used to encode a video stream. For example, for some picture blocks or picture frames, the video encoder 20 may directly quantize a residual signal, processing by the transform processing unit 206 is not required, and correspondingly, processing by the inverse transform processing unit 212 is not required either. Alternatively, for some picture blocks or picture frames, the video encoder 20 does not generate residual data, and correspondingly, processing by the transform processing unit 206, the quantization unit 208, the inverse quantization unit 210, and the inverse transform processing unit 212 is not required. Alternatively, the video encoder 20 may directly store a reconstructed picture block as a reference block, and processing by the filter 220 is not required. Alternatively, the quantization unit 208 and the inverse quantization unit 210 in the video encoder 20 may be combined. The loop filter 220 is optional. In addition, in a case of lossless compression coding, the transform processing unit 206, the quantization unit 208, the inverse quantization unit 210, and the inverse transform processing unit 212 are optional. It should be understood that in different application scenarios, the inter prediction unit 244 and the intra prediction unit 254 may be selectively enabled.

Figure 3:
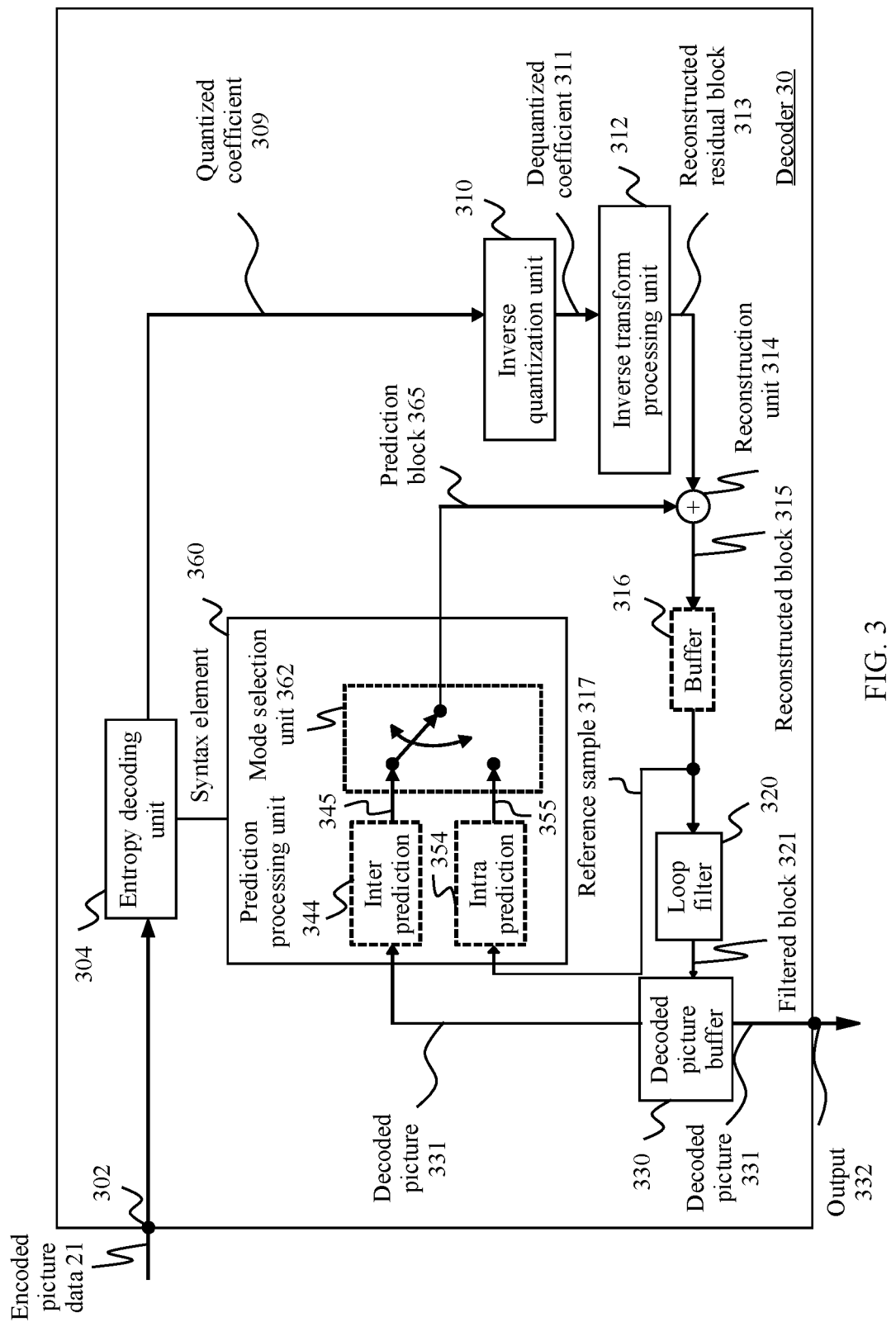
FIG. 3 is a schematic structural block diagram of an example of a video decoder used to implement an embodiment of this disclosure.

FIG. 3 is a schematic/conceptual block diagram of an example of a decoder 30 configured to implement an embodiment of this disclosure. The video decoder 30 is configured to receive encoded picture data (for example, an encoded bitstream) 21 encoded by, for example, the encoder 20, to obtain a decoded picture 231. In a decoding process, the video decoder 30 receives video data from the video encoder 20, for example, an encoded video bitstream that represents a picture block in an encoded video slice and an associated syntax element.

In the example of FIG. 3, the decoder 30 includes an entropy decoding unit 304, an inverse quantization unit 310, an inverse transform processing unit 312, a reconstruction unit 314 (for example, a summer 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding pass generally reciprocal to the encoding pass described with reference to the video encoder 20 in FIG. 2.

The entropy decoding unit 304 is configured to perform entropy decoding on the encoded picture data 21 to obtain, for example, a quantized coefficient 309 and/or a decoded encoding parameter (not shown in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive syntax elements at a video slice level and/or a video block level.

The inverse quantization unit 310 may have a same function as the inverse quantization unit 110. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. The inter prediction unit 344 may resemble the inter prediction unit 244 in function, and the intra prediction unit 354 may resemble the intra prediction unit 254 in function. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When the video slice is encoded into an intra-encoded (I) slice, the intra prediction unit 354 of the prediction processing unit 360 is configured to generate the prediction block 365 for a picture block in the current video slice based on a signaled intra prediction mode and data that is from a previously decoded block of a current frame or picture. When the video frame is encoded into an inter encoded (namely, B or P) slice, the inter prediction unit 344 (for example, a motion compensation unit) in the prediction processing unit 360 is configured to generate a prediction block 365 of a video block in the current video slice based on a motion vector and the another syntax element that is received from the entropy decoding unit 304. For inter prediction, the prediction block may be generated from one of reference pictures in one reference picture list. The video decoder 30 may construct reference frame lists: a list 0) and a list 1, by using a default construction technology based on reference pictures stored in the DPB 330.

The prediction processing unit 360 is configured to determine prediction information for the video block in the current video slice by parsing the motion vector and the another syntax element, and use the prediction information to generate the prediction block for the current video block that is being decoded. In an example of this disclosure, the prediction processing unit 360 determines, by using some received syntax elements, a prediction mode (for example, intra or inter prediction) for encoding the video block in the video slice, an inter prediction slice type (for example, a B slice, a P slice, or a GPB slice), construction information of one or more of reference picture lists for the slice, a motion vector of each inter encoded video block for the slice, an inter prediction status of each inter encoded video block in the slice, and other information, to decode the video block in the current video slice. In another example of this disclosure, the syntax element received by the video decoder 30 from the bitstream includes a syntax element in one or more of an adaptive parameter set (APS), a sequence parameter set (SPS), a picture parameter set (PPS), or a slice header.

The inverse quantization unit 310 may be configured to perform inverse quantization (namely, dequantization) on a quantized transform coefficient provided in the bitstream and decoded by the entropy decoding unit 304. An inverse quantization process may include: using a quantization parameter calculated by the video encoder 20 for each video block in the video slice, to determine a quantization degree that should be applied and, likewise, an inverse quantization degree that should be applied.

The inverse transform processing unit 312 is configured to apply an inverse transform (for example, an inverse DCT, an inverse integer transform, or a conceptually similar inverse transform process) to a transform coefficient, to generate a residual block in a sample domain.

The reconstruction unit 314 (for example, the summator 314) is configured to add an inverse transform block 313 (namely, a reconstructed residual block 313) to the prediction block 365, to obtain a reconstructed block 315 in a sample domain, for example, by adding sample values of the reconstructed residual block 313 and sample values of the prediction block 365.

The loop filter unit 320 (in a coding loop or after a coding loop) is configured to filter the reconstructed block 315 to obtain a filtered block 321, to smooth sample transition or improve video quality. In an example, the loop filter unit 320 may be configured to perform any combination of filtering technologies described below: The loop filter unit 320 is intended to represent one or more loop filters such as a deblocking filter, a sample-adaptive offset (SAO) filter, or another filter, for example, a bilateral filter, an adaptive loop filter (ALF), a sharpening or smoothing filter, or a collaborative filter. Although the loop filter unit 320 is shown as an in-loop filter in FIG. 3, in another configuration, the loop filter unit 320 may be implemented as a post-loop filter.

Then, a decoded video block 321 in a given frame or picture is stored in the decoded picture buffer 330 that stores a reference picture used for subsequent motion compensation.

The decoder 30 is configured to, for example, output the decoded picture 31 via an output 332, for presentation or viewing to a user.

Another variant of the video decoder 30 may be used to decode a compressed bitstream. For example, the decoder 30 may generate an output video stream without the loop filter unit 320. For example, a non-transform based decoder 30 may directly inverse-quantize a residual signal without the inverse transform processing unit 312 for some blocks or frames. In another implementation, the video decoder 30 may have the inverse quantization unit 310 and the inverse transform processing unit 312 that are combined into a single unit.

Specifically, in this embodiment of this disclosure, the decoder 30 is configured to implement a video decoding method described in the following embodiments.

It should be understood that the video decoder in this disclosure may include only some modules in the video decoder 30. For example, the video decoder in this disclosure may include a partitioning unit and a picture coding unit. The picture coding unit may include one or more of a prediction unit, a transform unit, a quantization unit, and an entropy encoding unit.

In addition, another structural variant of the video decoder 30 can be used to decode an encoded video bitstream. For example, the video decoder 30 may generate an output video stream without processing by the filter 320. Alternatively, for some picture blocks or picture frames, the entropy decoding unit 304 of the video decoder 30 does not obtain quantized coefficients through decoding, and correspondingly, there is no need for the inverse quantization unit 310 and the inverse transform processing unit 312 to perform processing. The loop filter 320 is optional. In addition, in a case of lossless compression, the inverse quantization unit 310 and the inverse transform processing unit 312 are also optional. It should be understood that in different application scenarios, the inter prediction unit and the intra prediction unit may be selectively enabled.

It should be understood that, in the encoder 20 and the decoder 30 in this disclosure, a processing result for a procedure may be output to a next procedure after being further processed. For example, after a procedure such as interpolation filtering, motion vector derivation, or loop filtering, an operation such as clip or shift is further performed on a processing result of the corresponding procedure.

For example, a motion vector that is of a control point of a current picture block and that is derived based on a motion vector of a neighboring affine coding block (a coding block that is predicted by using an affine motion model may be referred to as an affine coding block) or a motion vector that is of a subblock of the current picture block and that is derived based on the motion vector of the neighboring affine coding block may further be processed. This is not limited in this disclosure. For example, a value of the motion vector is constrained to be within a specific bit depth range. Assuming that an allowed bit depth of the motion vector is bitDepth, the value of the motion vector ranges from $-2\hat{\,}$(bitDepth$-1$) to $2\hat{\,}$(bitDepth$-1$)$-1$, where the symbol "$\hat{\,}$" represents exponentiation. If bitDepth is 16, the value ranges from $-32768$ to $32767$. If bitDepth is 18, the value ranges from $-131072$ to $131071$.

For another example, the value of the motion vector (for example, motion vectors MVs of four 4×4 subblocks within one 8×8 picture block) may further be constrained, so that a maximum difference between integer parts of the MVs of the four 4×4 subblocks does not exceed N (for example, N may be set to 1) samples.

Figure 4:
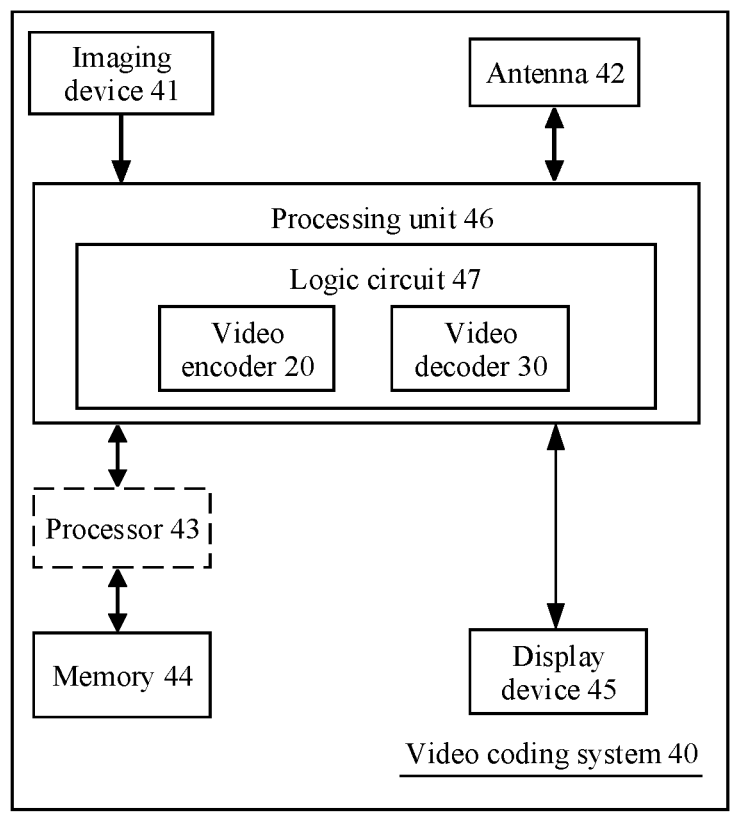
FIG. 4 is a schematic structural block diagram of an example of a video coding system used to implement an embodiment of this disclosure.

FIG. 4 is an illustrative diagram of an example of a video coding system 40 including the encoder 20 in FIG. 2 and/or the decoder 30 in FIG. 3 according to an example embodiment. The video coding system 40 can implement a combination of various technologies in the embodiments of this disclosure. In the illustrated implementation, the video coding system 40 may include an imaging device 41, the encoder 20, the decoder 30 (and/or a video encoder/decoder implemented by a logic circuit 47 of a processing unit 46), an antenna 42, one or more processors 43, one or more memories 44, and/or a display device 45.

As shown in FIG. 4, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated with the encoder 20 and the decoder 30, the video coding system 40 may include only the encoder 20 or only the decoder 30 in different examples.

In some examples, the antenna 42 may be configured to transmit or receive an encoded bitstream of video data. In addition, in some examples, the display device 45 may be configured to present the video data. In some examples, the logic circuit 47 may be implemented by the processing unit 46. The processing unit 46 may include application-specific integrated circuit (application-specific integrated circuit, ASIC) logic, a graphics processor, a general-purpose processor, or the like. The video coding system 40 may also include the optional processor 43. The optional processor 43 may similarly include application-specific integrated circuit (ASIC) logic, a graphics processor, a general-purpose processor, or the like. In some examples, the logic circuit 47 may be implemented by hardware, for example, video coding dedicated hardware, and the processor 43 may be implemented by general-purpose software, an operating system, or the like. In addition, the memory 44 may be a memory of any type, for example, a volatile memory (for example, a static random access memory (SRAM) or a dynamic random access memory (DRAM)) or a nonvolatile memory (for example, a flash memory). In a non-limitative example, the memory 44 may be implemented as a cache memory. In some examples, the logic circuit 47 may access the memory 44 (for example, for implementation of a picture buffer). In another example, the logic circuit 47 and/or the processing unit 46 may include a memory (for example, a cache) for implementation of a picture buffer or the like.

In some examples, the encoder 20 implemented by using the logic circuit may include a picture buffer (which is implemented by, for example, the processing unit 46 or the memory 44) and a graphics processing unit (which is implemented by, for example, the processing unit 46). The graphics processing unit may be communicatively coupled to the picture buffer. The graphics processing unit may include the encoder 20 implemented by using the logic circuit 47, to implement various modules that are described with reference to FIG. 2 and/or any other encoder system or subsystem described in this specification. The logic circuit may be configured to perform various operations described in this specification.

In some examples, the decoder 30 may be implemented by using the logic circuit 47 in a similar manner, to implement various modules that are described with reference to the decoder 30 in FIG. 3 and/or any other decoder system or subsystem described in this specification. In some examples, the decoder 30 implemented by using the logic circuit may include a picture buffer (which is implemented by, for example, the processing unit 46 or the memory 44) and a graphics processing unit (which is implemented by, for example, the processing unit 46). The graphics processing unit may be communicatively coupled to the picture buffer. The graphics processing unit may include the decoder 30 implemented by using the logic circuit 47, to implement various modules that are described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, and the like related to video frame encoding described in this specification, for example, data related to coding partitioning (for example, a transform coefficient or a quantized transform coefficient, an optional indicator (as described), and/or data that defines the coding partitioning). The video coding system 40 may further include the decoder 30 coupled to the antenna 42 and configured to decode the encoded bitstream. The display device 45 is configured to present a video frame.

It should be understood that, in this embodiment of this disclosure, relative to the example described with reference to the encoder 20, the decoder 30 may be configured to perform an inverse process. With regard to signaling a syntax element, the decoder 30 may be configured to receive and parse such a syntax element and correspondingly decode related video data. In some examples, the encoder 20 may entropy encode the syntax element into an encoded video bitstream. In such examples, the decoder 30 may parse the syntax element and correspondingly decode the related video data.

Figure 5:
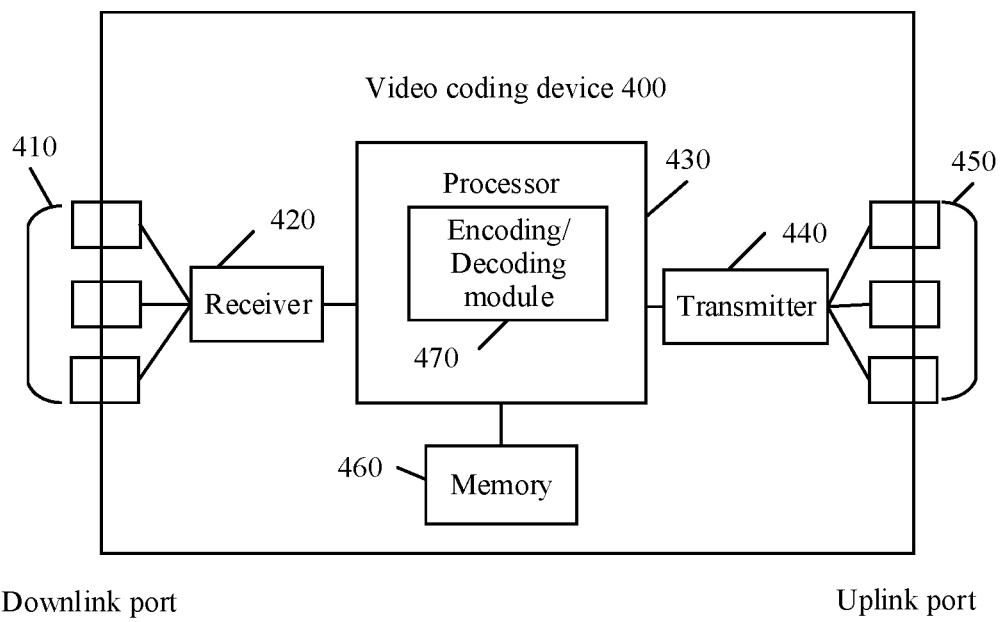
FIG. 5 is a schematic structural block diagram of an example of a video coding device used to implement an embodiment of this disclosure.

FIG. 5 is a schematic structural diagram of a video coding device 400 (for example, a video encoding device 400 or a video decoding device 400) according to an embodiment of the present disclosure. The video coding device 400 is suitable for implementing the embodiments described in this specification. In an embodiment, the video coding device 400 may be a video decoder (for example, the decoder 30 in FIG. 3) or a video encoder (for example, the encoder 20 in FIG. 2). In another embodiment, the video coding device 400 may be one or more components of the decoder 30 in FIG. 3 or the encoder 20 in FIG. 2.

The video coding device 400 includes: ingress ports 410 and a receiving unit (Rx) 420 that are configured to receive data: a processor, a logic unit, or a central processing unit (CPU) 430 that is configured to process the data: a transmitter unit (Tx) 440 and egress ports 450 that are configured to transmit the data: and a memory 460 configured to store the data. The video coding device 400 may further include an optical-to-electrical conversion component and an electrical-to-optical (EO) component coupled to the ingress port 410, the receiver unit 420, the transmitter unit 440, and the egress port 450 for egress or ingress of optical or electrical signals.

The processor 430 is implemented by hardware and software. The processor 430 may be implemented as one or more CPU chips, cores (for example, a multi-core processor), FPGAS, ASICs, and DSPs. The processor 430 communicates with the ingress port 410, the receiver unit 420, the transmitter unit 440, the egress port 450, and the memory 460. The processor 430 includes a coding module 470 (for example, an encoding module 470) or a decoding module 470). The encoding/decoding module 470 implements the embodiments disclosed in this specification, to implement the inter prediction method provided in the embodiments of this disclosure. For example, the encoding/decoding module 470) performs, processes, or provides various coding operations. Therefore, the encoding/decoding module 470 substantially improves functions of the video coding device 400 and affects transform of the video coding device 400 to a different state. Alternatively, the encoding/decoding module 470 is implemented as an instruction stored in the memory 460 and executed by the processor 430.

The memory 460 includes one or more disks, tape drives, and solid-state drives, and may be used as an overflow data storage device, to store programs when such programs are selected for execution, and to store instructions and data that are read during program execution. The memory 460 may be volatile and/or nonvolatile, and may be a read-only memory (ROM), a random access memory (RAM), a ternary content-addressable memory (ternary content-addressable memory, TCAM), and/or a static random access memory (SRAM).

Figure 6:
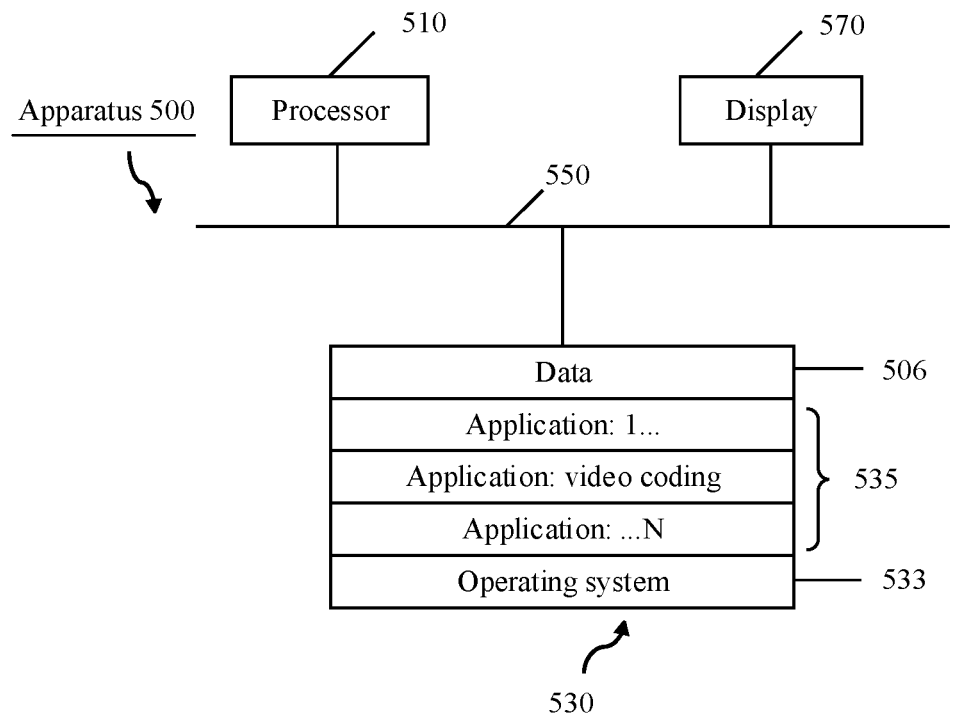
FIG. 6 is a schematic block diagram of an example of an encoding apparatus or a decoding apparatus used to implement an embodiment of this disclosure.
Figure 7:
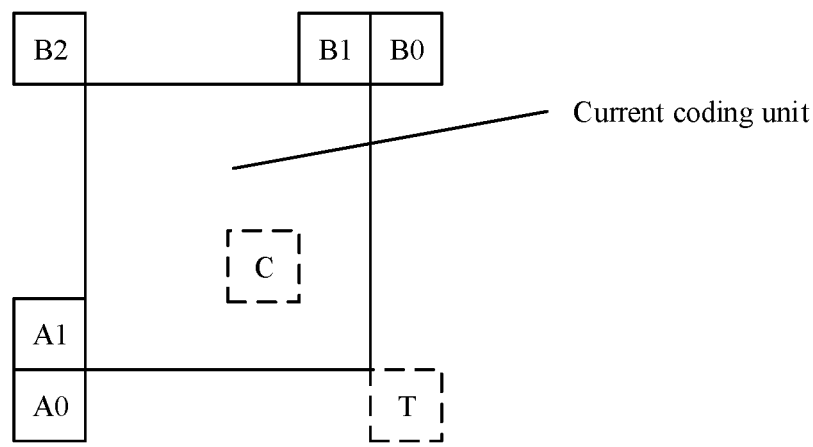
FIG. 7 is a schematic diagram of spatial and temporal candidate motion information of a current coding unit.

FIG. 6 is a simplified block diagram of an apparatus 500 that may be used as either or two of the source device 12 and the destination device 14 in FIG. 1 according to an example embodiment. The apparatus 500 may implement the technologies of this disclosure. In other words, FIG. 6 is a schematic block diagram of an implementation of an encoding device or a decoding device (briefly referred to as a coding device 500) according to an embodiment of this disclosure. The coding device 500 may include a processor 510, a memory 530, and a bus system 550. The processor and the memory are connected through the bus system. The memory is configured to store instructions. The processor is configured to execute the instructions stored in the memory. The memory of the coding device stores program code. The processor may invoke the program code stored in the memory, to perform various video encoding or decoding methods described in this disclosure, particularly various new picture block partitioning methods. To avoid repetition, details are not described herein again.

In this embodiment of this disclosure, the processor 510 may be a central processing unit (CPU). Alternatively, the processor 510 may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The memory 530 may include a read-only memory (ROM) device or a random access memory (RAM) device. Any other storage device of an appropriate type may alternatively be used as the memory 530. The memory 530 may include code and data 531 accessed by the processor 510 through the bus 550. The memory 530 may further include an operating system 533 and an application program 535. The application program 535 includes at least one program that allows the processor 510 to perform the video encoding or decoding method described in this disclosure. For example, the application program 535 may include applications 1 to N, and further include a video encoding or decoding application (referred to as a video coding application for short) that performs the video encoding or decoding method described in this disclosure.

In addition to a data bus, the bus system 550) may further include a power bus, a control bus, a status signal bus, and the like. However, for clear description, various types of buses in the figure are marked as the bus system 550.

Optionally, the coding device 500 may further include one or more output devices, for example, a display 570). In an example, the display 570) may be a touch-sensitive display that combines a display and a touch-sensitive unit that is operable to sense a touch input. The display 570) may be connected to the processor 510 through the bus 550.

To better understand the inter prediction method in the embodiments of this disclosure, the following first describes some related concepts or content of inter prediction.

Inter prediction means searching a reconstructed picture for a matched reference block for a current block in a current picture, and using a sample value of a sample in the reference block as a predicted value of a sample value of a sample in the current block. (This process is referred to as motion estimation (ME)).

Motion estimation is to try a plurality of reference blocks in a reference picture for a current block, and then finally determine one or two reference blocks (two reference blocks are required for bidirectional prediction) from the plurality of reference blocks by using rate-distortion optimization (RDO) or another method. The reference block is used to perform inter prediction on the current block.

Motion information of the current block includes indication information of a prediction direction (which is usually forward prediction, backward prediction, or bidirectional prediction), one or two motion vectors (MV) pointing to the reference block, indication information of the picture in which the reference block is located (which is usually represented by using a reference index (reference index)).

Forward prediction means selecting a reference picture from a forward reference picture set, to obtain a reference block for a current block. Backward prediction means selecting a reference picture from a backward reference picture set, to obtain a reference block for a current block. Bidirectional prediction means selecting a reference picture from a forward reference picture set and a reference picture from a backward reference picture set, to obtain a reference block. When a bidirectional prediction method is used, a current coding block has two reference blocks. Each reference block should be indicated by using a motion vector and a reference index. Then, a predicted value of a sample value of a sample in the current block is determined based on sample values of samples in the two reference blocks.

In HEVC, there are two inter prediction modes: an AMVP mode and a merge mode.

In the AMVP mode, spatially or temporally neighboring encoded blocks (denoted as neighboring blocks) of a current coding block are first traversed. A candidate motion vector list is constructed based on motion information of the neighboring blocks. Then, an optimal motion vector is determined from the candidate motion information list based on a rate-distortion cost, and candidate motion information with a minimum rate-distortion cost is used as a motion vector predictor (MVP) of the current coding block.

Locations and a traversal order of the neighboring blocks are predefined. The rate-distortion cost may be obtained through calculation by using a formula (1), where J is the rate-distortion cost, SAD is a sum of absolute differences (sum of absolute differences, SAD) between an original sample value and a predicted sample value that is obtained through motion estimation performed by using a candidate motion vector predictor, R is a bit rate, and $\lambda$ is a Lagrange multiplier. An encoder side transfers, to a decoder side, an index value and a reference frame index value of a selected motion vector predictor in the candidate motion vector list. Further, the encoder side may perform motion search in a neighborhood centered on the MVP to obtain an actual motion vector of the current coding block, and then transfer a difference (motion vector difference) between the MVP and the actual motion vector to the decoder side.

$$J = SAD + \lambda R \qquad (1)$$

In addition, in terms of different motion models, the AMVP mode may be classified into a translational model-based AMVP mode and a non-translational model-based AMVP mode.

In the merge mode, a candidate motion information list is first constructed based on motion information of a spatially or temporally encoded unit of a current coding unit. Then, optimal motion information is determined from the candidate motion information list as motion information of the current coding unit based on a rate-distortion cost. Finally, an index value (denoted as a merge index hereinafter) of a location of the optimal motion information in the candidate motion information list is transferred to the decoder side.

In the merge mode, spatial and temporal candidate motion information of the current coding unit may be shown in FIG.

7. The spatial candidate motion information comes from five spatially neighboring blocks (A0, A1, B0, B1, and B2). If the neighboring blocks are unavailable or a prediction mode is intra prediction, the neighboring blocks are not added to the candidate motion information list.

The temporal candidate motion information of the current coding unit may be obtained by scaling an MV of a block at a corresponding location in a reference frame based on picture order counts (POC) of the reference frame and a current frame. When the block at the corresponding location in the reference frame is obtained, it may be first determined whether a block at a location T in the reference frame is available. If the block at the location T is unavailable, a block at a location C is selected.

When a translational model is used for prediction, same motion information is used for all samples in a coding unit, and then motion compensation is performed based on the motion information, to obtain a predicted sample value of the coding unit. However, in the real world, there are a variety of motions. Many objects, for example, a rotating object, a roller coaster rotating in different directions, fireworks, and some stunts in movies, are not in translational motion. If these moving objects, especially those in a UGC scenario, are encoded by using a block motion compensation technology based on the translational motion model in a current coding standard, coding efficiency is greatly affected. Therefore, to improve a coding effect, non-translational motion model-based prediction is provided.

In non-translational motion model-based prediction, a same motion model is used on an encoder side and a decoder side to derive motion information of each motion compensation subunit in a current coding block, and then motion compensation is performed based on the motion information of the motion compensation subunit to obtain a prediction subblock of each subblock, to improve prediction efficiency. Common non-translational motion models include a 4-parameter affine motion model and a 6-parameter affine motion model.

The motion compensation subunit in the embodiments of this disclosure may be a sample or a sample block that is obtained through partitioning according to a specific method and whose size is N1×N2, where both N1 and N2 are positive integers, N1 may be equal to or may not be equal to N2.

The following briefly describes the 4-parameter affine motion model and the 6-parameter affine motion model.

The 4-parameter affine motion model:
The 4-parameter affine motion model may be expressed as a formula (2).

$$\begin{cases} vx = a_1 + a_3 x + a_4 y \\ vy = a_2 - a_4 x + a_3 y \end{cases} \quad (2)$$

$a_1$, $a_2$, $a_3$, and as in the formula (2) are constants in the 4-parameter affine motion model, and are equivalent to coefficients in a formula (3).

Figure 8:
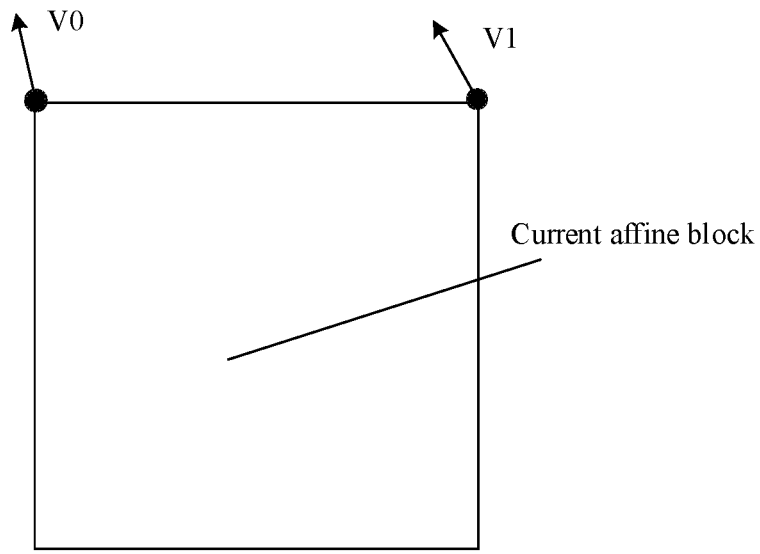
FIG. 8 is a schematic diagram of a 4-parameter affine motion model.
Figure 9:
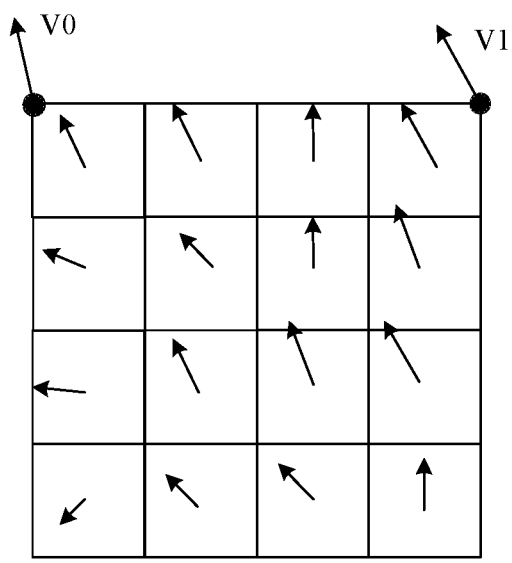
FIG. 9 is a schematic diagram of a motion vector of each subblock in a 4-parameter affine motion model.

As shown in FIG. 8, the 4-parameter affine motion model may be represented by motion vectors of two samples (a sample in the upper-left corner of a current affine block and a sample in the upper-right corner of the current affine block) and coordinates of the two samples relative to the top-left sample of the current coding block. A sample used to represent a motion model parameter is a control point. For the 4-parameter affine motion model, if the sample in the top-left corner (0, 0) and the sample in the top-right corner (W, 0) are used as control points, motion vectors $(vx_0, vy_0)$ and $(vx_1, vy_1)$ of the top-left control point and the top-right control point of the current coding block are first determined. Then, motion information of each motion compensation subunit in the current coding block is derived according to the formula (3) (as shown in FIG. 9).

$$\begin{cases} vx = \dfrac{vx_1 - vx_0}{W} x - \dfrac{vy_1 - vy_0}{W} y + vx_0 \\ vy = \dfrac{vy_1 - vy_0}{W} x + \dfrac{vx_1 - vx_0}{W} y + vy_0 \end{cases} \quad (3)$$

In the formula (3), (x, y) are coordinates of the motion compensation subunit relative to the top-left sample of the current coding block, W is the width of the current coding block, the motion vector of the top-left control point of the current coding block is $(vx_0, vy_0)$, and the motion vector $(vx_1, vy_1)$ of the top-right control point of the current coding block.

The 6-parameter affine motion model:
The 6-parameter affine motion model may be expressed as a formula (4).

$$\begin{cases} vx = a_1 + a_3 x + a_4 y \\ vy = a_2 + a_5 x + a_6 y \end{cases} \quad (4)$$

$a_1$, $a_2$, $a_3$, as, as, and as in the formula (4) are constants in the 6-parameter affine motion model, and are equivalent to coefficients in a formula (5).

Figure 10:
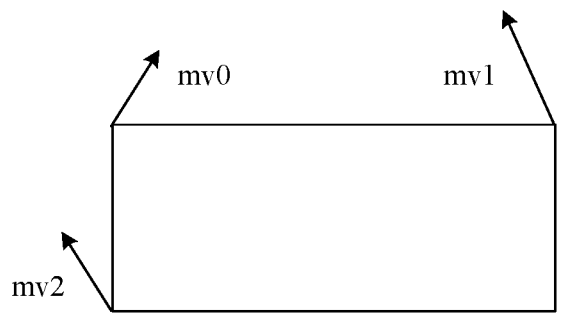
FIG. 10 is a schematic diagram of a 6-parameter affine motion model.

As shown in FIG. 10, the 6-parameter affine motion model may be represented by motion vectors of three samples and coordinates of the three samples relative to the top-left sample of a current coding block.

In the 6-parameter affine motion model, if the sample in the top-left corner (0, 0), the sample in the top-right corner (W, 0), and the sample in the bottom-left corner (0, H) are used as control points, motion vectors mv0 $(vx_0, vy_0)$, mv1 $(vx_1, vy_1)$, and mv2 $(vx_2, vy_2)$ of the top-left control point, the top-right control point, and the bottom-left control point of the current coding block are first determined. Then, motion information of each motion compensation subunit in the current coding block is derived according to the formula (5).

$$\begin{cases} vx = \dfrac{vx_1 - vx_0}{W} x + \dfrac{vx_2 - vy_0}{H} y + vx_0 \\ vy = \dfrac{vy_1 - vy_0}{W} x + \dfrac{vy_2 - vx_0}{H} y + vy_0 \end{cases} \quad (5)$$

In the formula (5), (x, y) are coordinates of the motion compensation subunit relative to the top-left sample of the current coding block, W is the width of the current coding block, H is the height of the current coding block, the motion vector of the top-left control point of the current coding block is $(vx_0, vy_0)$, the motion vector of the top-right control point of the current coding block is $(vx_1, vy_1)$, and the motion vector of the bottom-left control point of the current coding block is $(vx_2, vy_2)$.

A coding block that is predicted by using an affine motion model is referred to as an affine coding block.

Generally, motion information of a control point of the affine coding block may be obtained by using an affine motion model-based AMVP mode or an affine merge mode.

The motion information of the control point may be obtained by using an inherited control point motion vector prediction method or a constructed control point motion vector prediction method.

Figure 11:
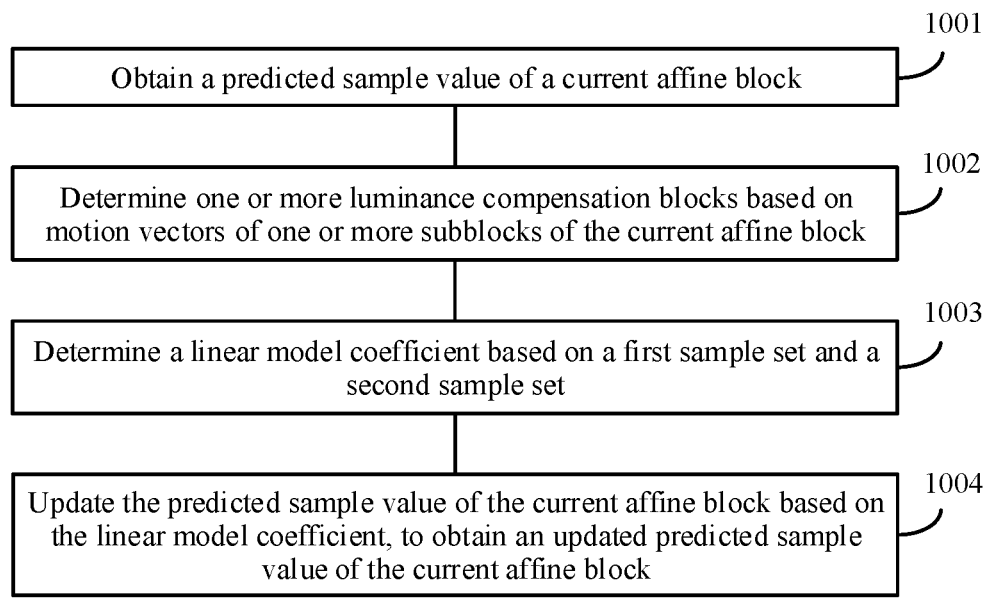
FIG. 11 is a schematic flowchart of an inter prediction method according to an embodiment of this disclosure.

FIG. 11 is a schematic flowchart of an inter prediction method according to an embodiment of this disclosure.

It should be understood that the inter prediction method shown in FIG. 11 may be an inter prediction method for a video picture, and the inter prediction method shown in FIG. 11 may be performed by the encoder 20 shown in FIG. 2 or the decoder 30 shown in FIG. 3. The method shown in FIG. 11 includes operation 1001 to operation 1003. The following describes these operations in detail.

1001: Obtain a predicted sample value of a current affine block.

The current affine block may be a picture block on which inter prediction processing is being performed. When the method shown in FIG. 11 is a video picture encoding method, the current affine block is a current affine coding block. When the method shown in FIG. 11 is a video picture decoding method, the current affine block is a current affine decoding block.

In this disclosure, a predicted sample value may also be referred to as a predicted sample value. To avoid confusion, the predicted sample value is uniformly used in this disclosure.

Optionally, obtaining the predicted sample value of the current affine block in operation 1001 specifically includes: obtaining a predicted sample value of each subblock in the current affine block by performing motion compensation on each subblock based on a motion vector of each subblock, to finally obtain the predicted sample value of the current affine block.

1002: Determine one or more luminance compensation blocks based on motion vectors of one or more subblocks of the current affine block.

It should be understood that in operation 1002, based on the motion vectors of the one or more subblocks of the current affine block, the one or more luminance compensation blocks are determined in a reference frame corresponding to the current affine block.

In operation 1002, a final purpose of determining the one or more luminance compensation blocks is to perform luminance compensation (which may also be referred to as local illumination compensation) on the predicted sample value of the current affine block.

Specifically, a second sample set may be determined by obtaining the one or more luminance compensation blocks, so that a linear model coefficient is subsequently determined with reference to a first sample set determined based on the current affine block. Further, the predicted sample value of the current affine block is updated based on the linear model coefficient.

1003: Determine the linear model coefficient based on the first sample set and the second sample set, where the first sample set includes at least one reconstructed sample neighboring to an edge of the current affine block, the second sample set includes at least one reconstructed sample neighboring to an edge of the one or more luminance compensation blocks, and the sample in the first sample set is in a one-to-one correspondence with the sample in the second sample set.

In operation 1002, there is a plurality of manners of determining the one or more luminance compensation blocks. The following describes some common determining manners and composition of the first sample set and the second sample set in different determining manners.

First manner: Determine, based on the motion vector of each of the plurality of subblocks of the current affine block, a luminance compensation block corresponding to each subblock, to obtain the plurality of luminance compensation blocks.

It should be understood that the plurality of subblocks are subblocks located on the edge of the current affine block. (For example, the plurality of subblocks may be subblocks on a left edge and an upper edge of the current affine block).

In the first manner, the luminance compensation block corresponding to each of the plurality of subblocks is determined based on the motion vector of each subblock, and a quantity of finally obtained luminance compensation blocks is the same as a quantity of subblocks in the current affine block.

Specifically, in the first manner, the plurality of subblocks include a luminance compensation block corresponding to the subblock on the left edge of the current affine block and/or a luminance compensation block corresponding to the subblock on the upper edge of the current affine block.

Optionally, in the first manner, the first sample set includes a reconstructed sample neighboring to the left edge and/or a reconstructed sample neighboring to the upper edge of the current affine block.

Optionally, in the first manner, the second sample set includes a reconstructed sample at a specific neighboring location of each of the plurality of luminance compensation blocks.

The plurality of luminance compensation blocks include a first-type luminance compensation block and/or a second-type luminance compensation block. The first-type luminance compensation block is the luminance compensation block corresponding to the subblock on the upper edge of the current affine block. The second-type luminance compensation block is the luminance compensation block corresponding to the subblock on the left edge of the current affine block. A reconstructed sample at a specific neighboring location of the first-type luminance compensation block is a reconstructed sample neighboring to an upper edge of the first-type luminance compensation block. A reconstructed sample at a specific neighboring location of the second-type luminance compensation block is a reconstructed sample neighboring to a left edge of the second-type luminance compensation block.

For ease of understanding, the plurality of luminance compensation blocks may further be spliced into one virtual luminance compensation block. A shape of the virtual luminance compensation block may be or may not be a rectangle. For example, the virtual luminance compensation block may be an irregular graphics block obtained by splicing the luminance compensation blocks.

Figure 12:
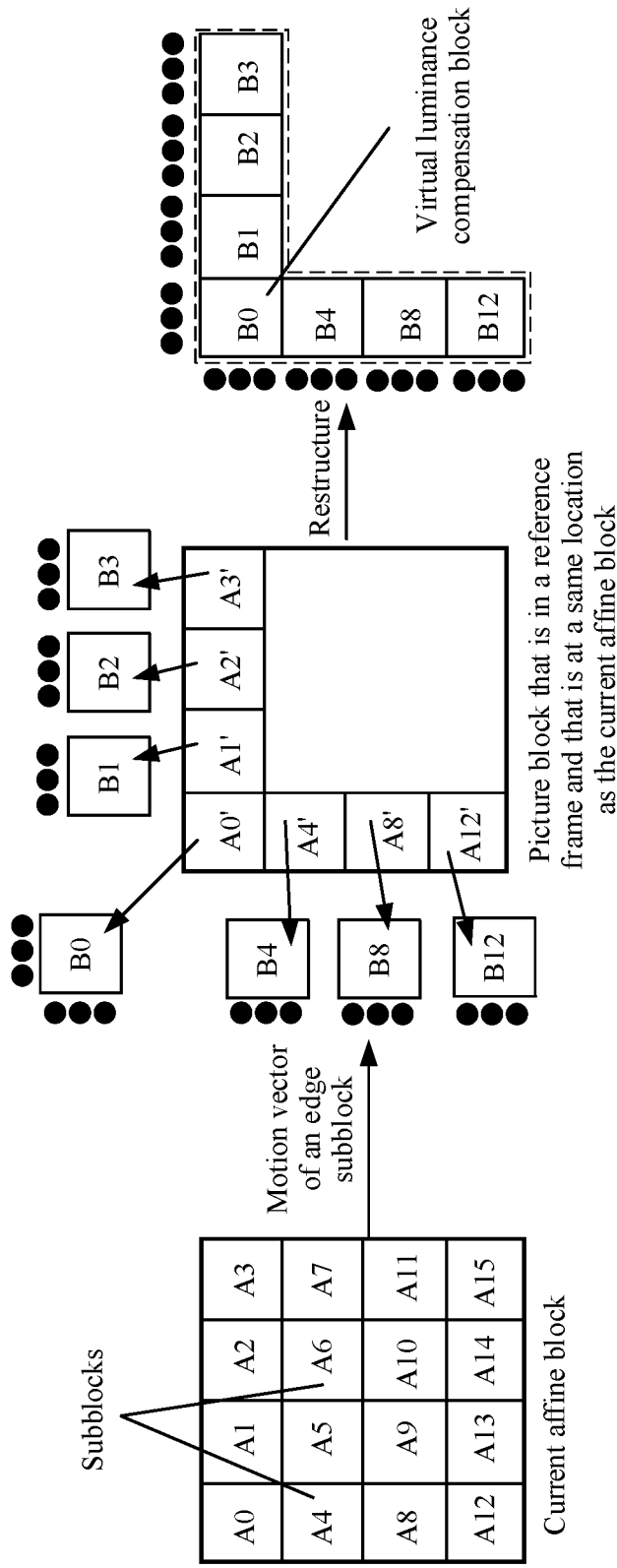
FIG. 12 is a schematic diagram of a current affine block and luminance compensation blocks corresponding to a left edge subblock and an upper edge subblock in the current affine block.

For example, as shown in FIG. 12, the current affine block includes 16 subblocks (A0 to A15). In this case, picture blocks (A0' to A3', A4', A8', and A12') at same locations as the subblocks (A0 to A3) on the upper edge and the subblocks (A4, A8, and A12) on the left edge of the current affine block may be first determined in the reference frame. Then, motion compensation is performed based on motion vectors of the subblocks on the upper edge and the subblocks on the left edge of the current affine block, to obtain seven luminance compensation blocks (B0 to B3, B4, B8, and B12) respectively corresponding to the seven subblocks.

Next, the seven luminance compensation blocks respectively corresponding to the seven subblocks may be spliced into one virtual luminance compensation block based on a location relationship of the seven subblocks in the current affine block, and the virtual luminance compensation block obtained through splicing is shown in FIG. 12. (A picture block in a dashed line box in FIG. 12 is the virtual luminance compensation block, and the virtual luminance compensation block is in an L shape).

When the virtual luminance compensation block is obtained through splicing based on the seven luminance compensation blocks, reconstructed samples neighboring to left edges and/or upper edges of these subblocks may be carried. Subblocks on a left edge of the virtual luminance compensation block include B0, B4, B8, and B12, and subblocks on an upper edge of the virtual luminance compensation block include B0 to B3 (where B0 may be a subblock on the left edge or a subblock on the upper edge).

In FIG. 12, the virtual luminance compensation block actually includes the luminance compensation blocks corresponding to the subblocks on the left edge and the luminance compensation blocks corresponding to the subblocks on the upper edge of the current affine block (in this case, the virtual luminance compensation block is in the L shape). Actually, the virtual luminance compensation block may alternatively include only the luminance compensation blocks corresponding to the subblocks on the left edge or the upper edge of the current affine block (in this case, the virtual luminance compensation block is a regular rectangle).

It should be understood that the subblock A0 in the upper-left corner is described as a subblock on the upper edge in the foregoing implementation, and because A0 is also located on the left edge of the current affine block, the subblock A0 may alternatively be described as a subblock on the left edge in another implementation.

It should be understood that, in the first manner, a sample included in the first sample set may be in a one-to-one correspondence with a sample included in the second sample set.

Figure 13:
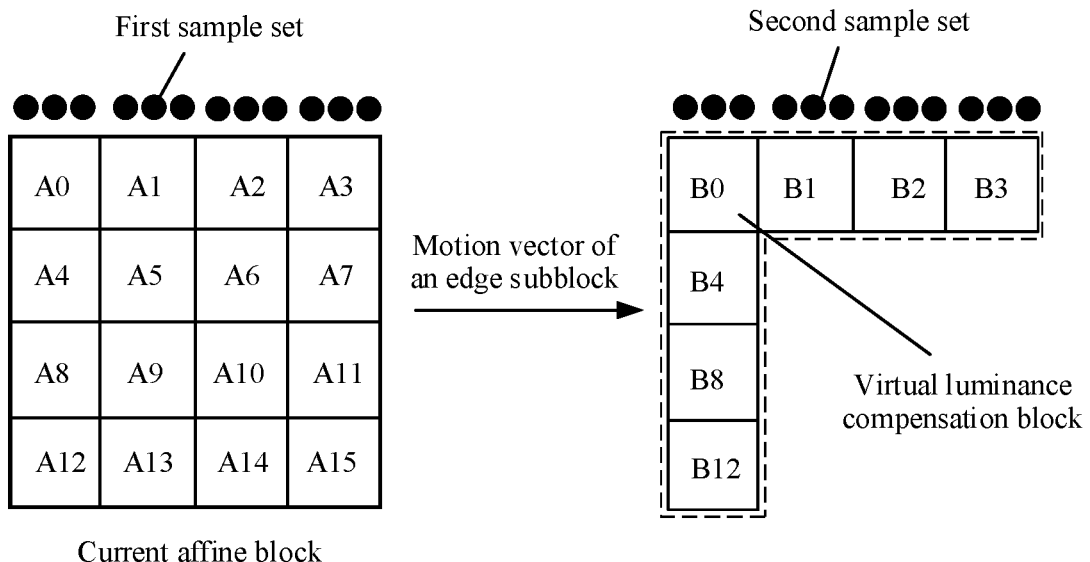
FIG. 13 is a schematic diagram of reconstructed samples included in a first sample set and a second sample set.

For example, as shown in FIG. 13, when the first sample set includes only reconstructed samples neighboring to the upper edge of the current affine block, the second sample set also includes only reconstructed samples neighboring to the upper edge of the virtual luminance compensation block.

In a feasible implementation, the first sample set includes a predetermined quantity of neighboring reconstructed samples exactly above the current affine block. Correspondingly, the second sample set includes a predetermined quantity of neighboring reconstructed samples exactly above the virtual luminance compensation block. For example, the predetermined quantity may be 16. In another example, the predetermined quantity is limited by a size of the current affine block. For example, the quantity of neighboring reconstructed samples that are included in the first sample set and that are exactly above the current affine block is equal to a smaller value between the predetermined quantity and the width of the current affine block. In other words, the quantity of samples in the first sample set=Min(predetermined quantity value, affine block width value). Min( ) is a function for obtaining a minimum value. It should be understood that composition of the second sample set corresponds to composition of the first sample set.

Figure 14:
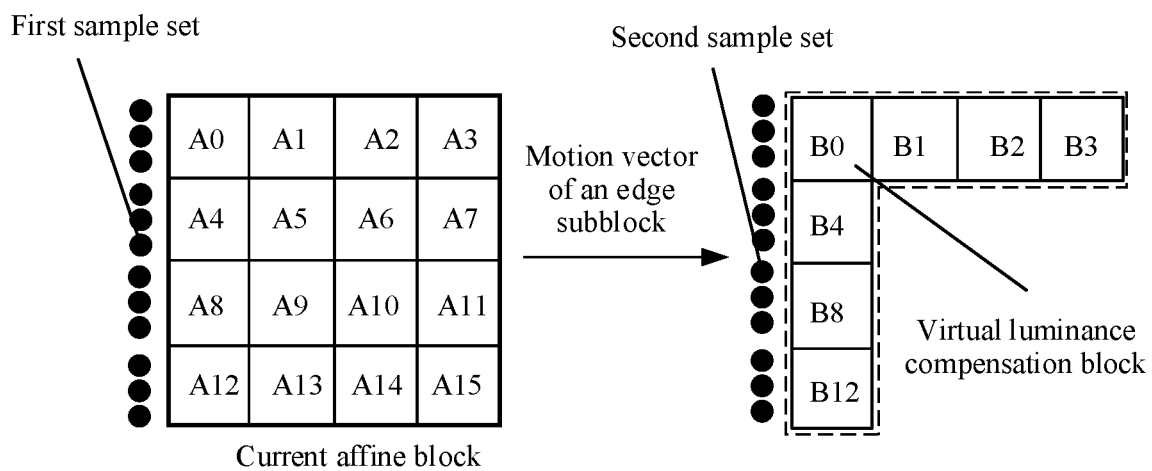
FIG. 14 is a schematic diagram of reconstructed samples included in a first sample set and a second sample set.

As shown in FIG. 14, when the first sample set includes only reconstructed samples neighboring to the left edge of the current affine block, the second sample set also includes only reconstructed samples neighboring to the left edge of the virtual luminance compensation block.

In a feasible implementation, the first sample set includes a predetermined quantity of neighboring reconstructed samples exactly left to the current affine block. Correspondingly, the second sample set includes a predetermined quantity of neighboring reconstructed samples exactly left to the virtual luminance compensation block. For example, the predetermined quantity may be 16. In another example, the predetermined quantity is limited by a size of the current affine block. For example, the quantity of neighboring reconstructed samples that are included in the first sample set and that are exactly left to the current affine block is equal to a smaller value between the predetermined quantity and the height of the current affine block. In other words, the quantity of samples in the first sample set=Min(predetermined quantity value, affine block height value). It should be understood that composition of the second sample set corresponds to composition of the first sample set.

Figure 15:
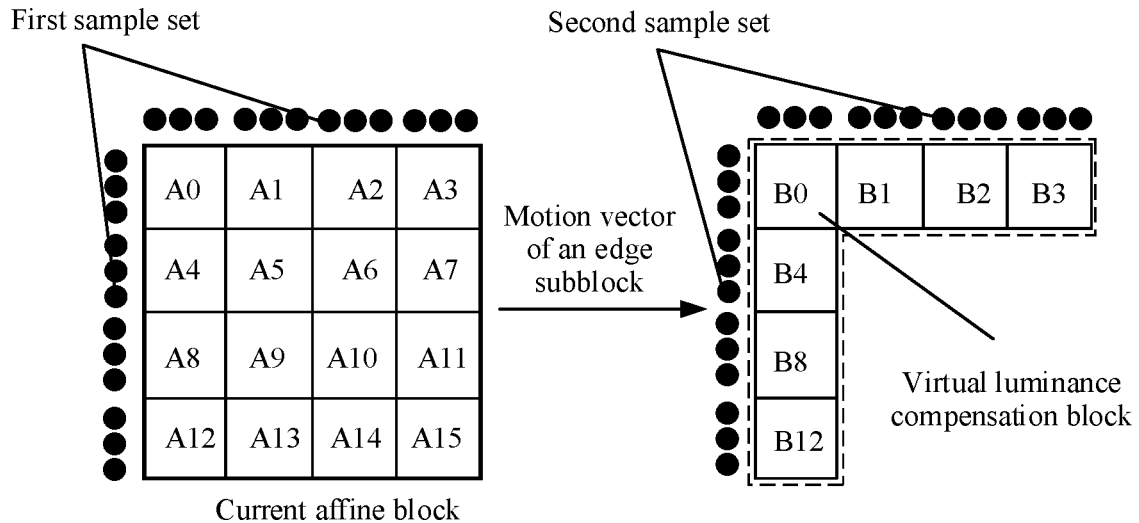
FIG. 15 is a schematic diagram of reconstructed samples included in a first sample set and a second sample set.

As shown in FIG. 15, when the first sample set includes both reconstructed samples neighboring to the left edge of the current affine block and reconstructed samples neighboring to the upper edge of the current affine block, the second sample set also includes both reconstructed samples neighboring to the left edge of the virtual luminance compensation block and reconstructed samples neighboring to the upper edge of the virtual luminance compensation block.

In a feasible implementation, the first sample set includes a predetermined quantity of neighboring reconstructed samples exactly left to the current affine block and a predetermined quantity of neighboring reconstructed samples exactly above the current affine block. Correspondingly, the second sample set includes a predetermined quantity of neighboring reconstructed samples exactly left to the virtual luminance compensation block and a predetermined quantity of neighboring reconstructed samples exactly above the virtual luminance compensation block. For example, the first sample set may include 16 neighboring reconstructed samples exactly left to the current affine block and 16 neighboring reconstructed samples exactly above the current affine block. In another example, the first sample set may include 8 neighboring reconstructed samples exactly left to the current affine block and 16 neighboring reconstructed samples exactly above the current affine block. In another example, the predetermined quantity is limited by a size of the current affine block. The quantity of neighboring samples that are in the first sample set and exactly left to the current affine block is equal to Min(vertically predetermined quantity value, affine block height value), and the quantity of neighboring samples that are in the first sample set and exactly above the current affine block is equal to Min (horizontally predetermined quantity value, affine block width value). Alternatively, in the first sample set, both the quantity of neighboring samples exactly left to the current affine block and the quantity of neighboring samples exactly above the current affine block are equal to Min(predetermined quantity value, affine block height value, affine block width value). It should be understood that the second sample set corresponds to the first sample set.

Second manner: Determine, based on a motion vector of a subblock at a first preset location in the current affine block, a luminance compensation block corresponding to the current affine block.

In the second manner, the motion vector of the subblock at the first preset location is used as a motion vector of the entire current affine block, and then the luminance compensation block corresponding to the entire current affine block is determined based on the motion vector. (In the second manner, only one luminance compensation block should be determined.)

In the second manner, a motion vector of a subblock at a fixed location in the current affine block is used to determine the luminance compensation block corresponding to the entire affine motion block, so that complexity of determining the luminance compensation block can be simplified.

The first preset location may be a fixed location in the current affine block. The subblock located at the first preset location may be a subblock whose upper-left corner (which may alternatively be another location such as the lower-left corner, the upper-right corner, or the lower-right corner) is located at the first preset location.

Specifically, when the width of the current affine block is W and the height of the current affine block is H, and coordinates of a sample in the upper-left corner of the current affine block is (x0, y0), coordinates of a subblock in the center of the current block are (x0+W/2, y0+H/2), and coordinates of a subblock in the upper-left corner of the current affine block are (x0, y0). For example, as shown in FIG. 12, when the first preset location is the upper-left corner of the current affine block, the subblock at the first preset location in the current affine block may be A0) (where the upper-left corner of the subblock A0 is located in the upper-left corner of the current affine block).

Optionally, the first preset location is the center of the current affine block.

For example, when the first preset location is the center of the current affine block, the subblock at the first preset location in the current affine block may be A10 (where the upper-left corner of the subblock A10 is located in the center of the current affine block).

It should be understood that the upper-left corner and the center are only two possible implementations of the first preset location. In this disclosure, any location in the current affine block may alternatively be set as the first preset location based on a requirement.

Figure 16:
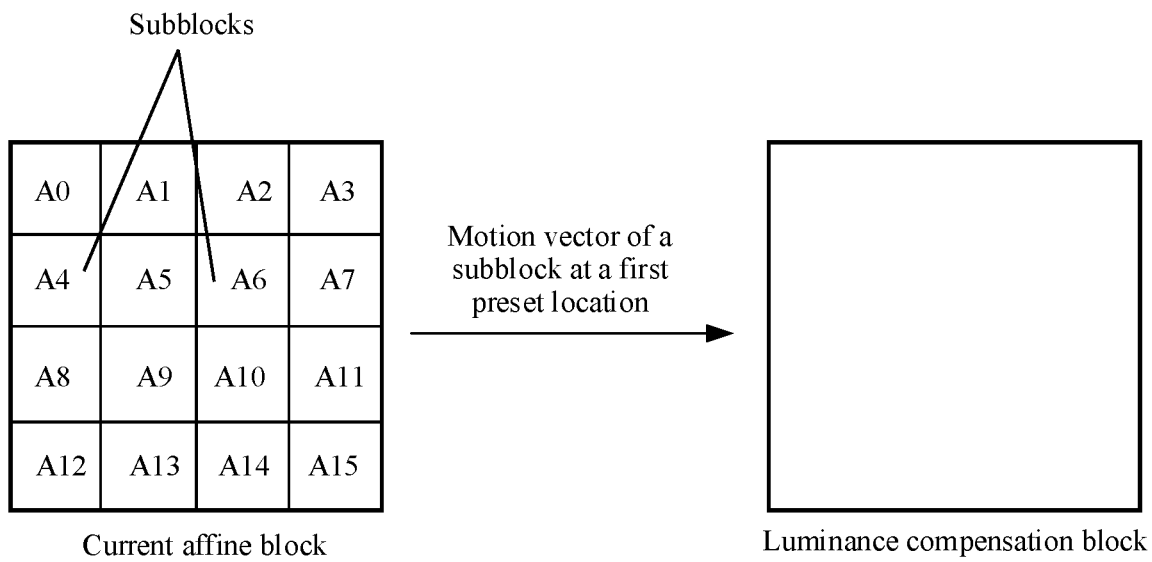
FIG. 16 is a schematic diagram of a current affine block and a luminance compensation block corresponding to the current affine block.

In the second manner, a process of obtaining, based on the motion vector of the subblock at the first preset location, the luminance compensation block corresponding to the current affine block may be shown in FIG. 16. As shown in FIG. 16, one luminance compensation block corresponding to the current affine block is obtained.

Optionally, in the second manner, the first sample set includes a reconstructed sample neighboring to the left edge and/or a reconstructed sample neighboring to the upper edge of the current affine block.

Optionally, in the second manner, the second sample set includes a reconstructed sample neighboring to a left edge and/or a reconstructed sample neighboring to an upper edge of the luminance compensation block corresponding to the affine block.

It should be understood that, in the second manner, a sample included in the first sample set may be in a one-to-one correspondence with a sample included in the second sample set.

Figure 17:
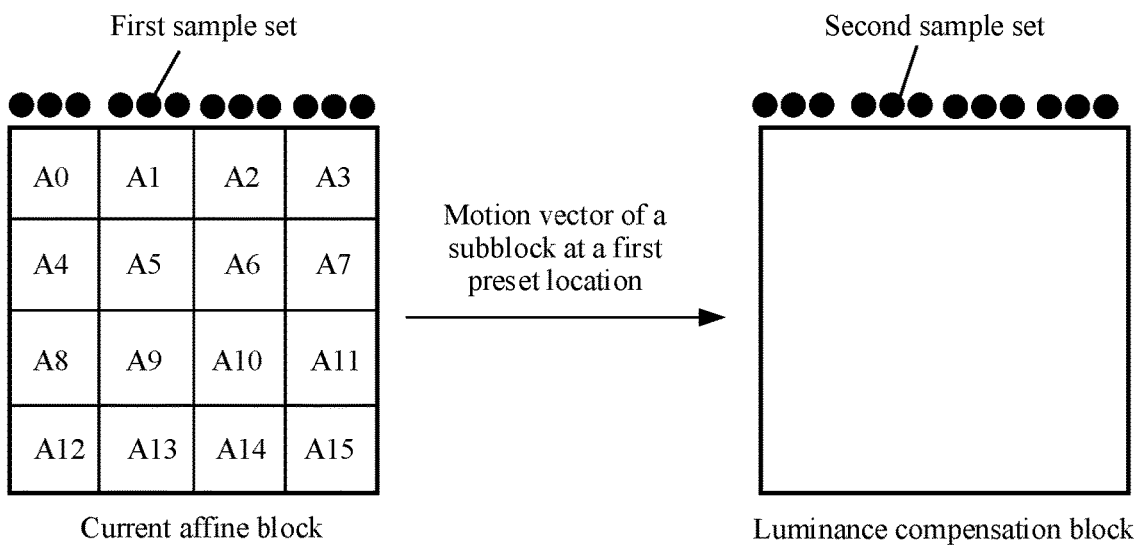
FIG. 17 is a schematic diagram of reconstructed samples included in a first sample set and a second sample set.

For example, as shown in FIG. 17, when the first sample set includes only reconstructed samples neighboring to the upper edge of the current affine block, the second sample set also includes only reconstructed samples neighboring to the upper edge of the luminance compensation block corresponding to the affine block.

In a feasible implementation, the first sample set includes a predetermined quantity of neighboring reconstructed samples exactly above the current affine block. Correspondingly, the second sample set includes a predetermined quantity of neighboring reconstructed samples exactly above the luminance compensation block corresponding to the affine block. For example, the predetermined quantity may be 16. In another example, the predetermined quantity is limited by a size of the current affine block. For example, the quantity of neighboring reconstructed samples that are included in the first sample set and that are exactly above the current affine block is equal to a smaller value between the predetermined quantity and the width of the current affine block. In other words, the quantity of samples in the first sample set=Min(predetermined quantity value, affine block width value). It should be understood that composition of the second sample set corresponds to composition of the first sample set.

Figure 18:
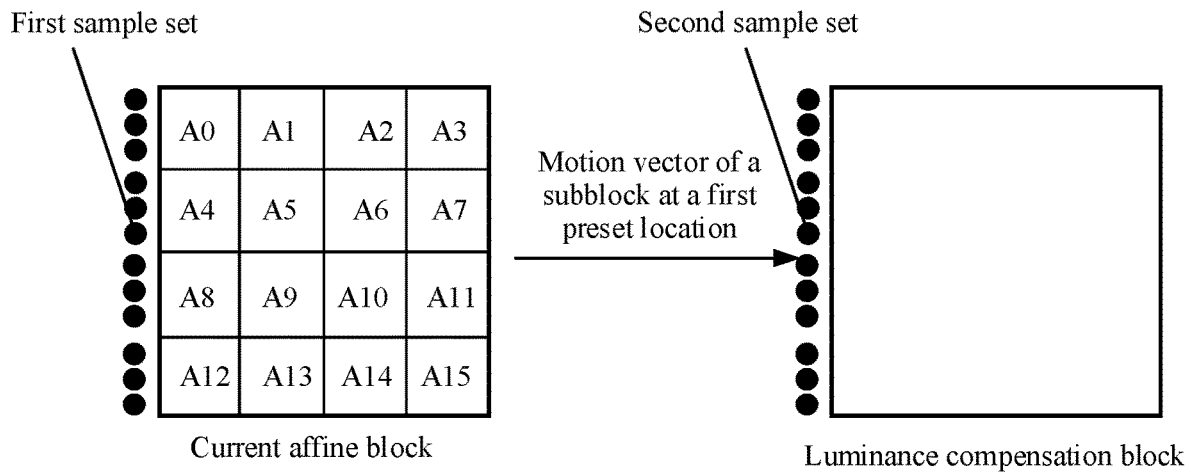
FIG. 18 is a schematic diagram of reconstructed samples included in a first sample set and a second sample set.

As shown in FIG. 18, when the first sample set includes only reconstructed samples neighboring to the left edge of the current affine block, the second sample set also includes only reconstructed samples neighboring to the left edge of the luminance compensation block corresponding to the affine block.

In a feasible implementation, the first sample set includes a predetermined quantity of neighboring reconstructed samples exactly left to the current affine block. Correspondingly, the second sample set includes a predetermined quantity of neighboring reconstructed samples exactly left to the luminance compensation block corresponding to the affine block. For example, the predetermined quantity may be 16. In another example, the predetermined quantity is limited by a size of the current affine block. For example, the quantity of neighboring reconstructed samples that are included in the first sample set and that are exactly left to the current affine block is equal to a smaller value between the predetermined quantity and the height of the current affine block. In other words, the quantity of samples in the first sample set=Min(predetermined quantity value, affine block height value). It should be understood that composition of the second sample set corresponds to composition of the first sample set.

Figure 19:
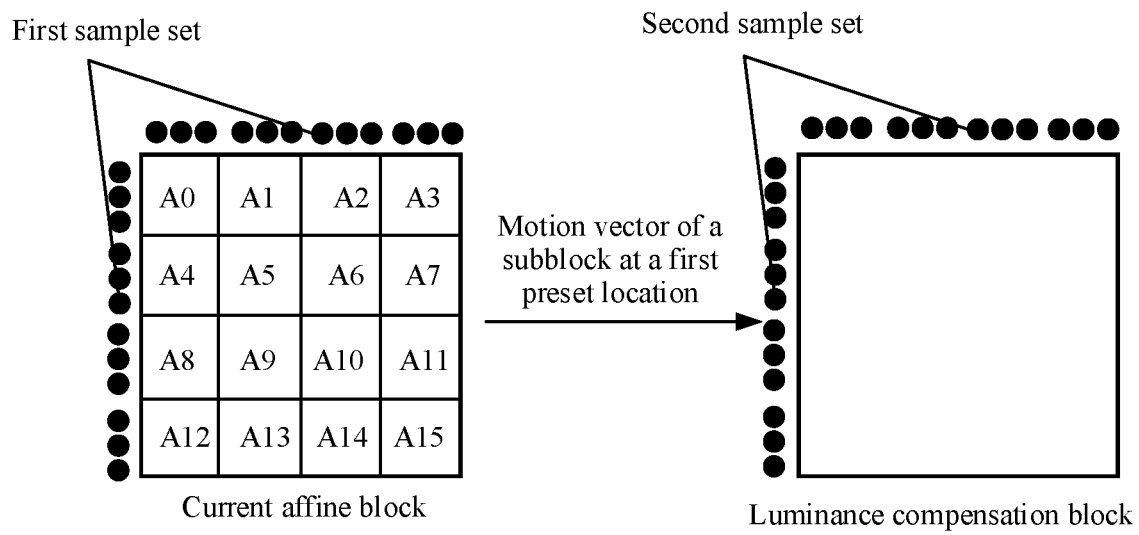
FIG. 19 is a schematic diagram of reconstructed samples included in a first sample set and a second sample set.

As shown in FIG. 19, when the first sample set includes both reconstructed samples neighboring to the left edge of the current affine block and reconstructed samples neighboring to the upper edge of the current affine block, the second sample set also includes both reconstructed samples neighboring to the left edge of the luminance compensation block corresponding to the affine block and reconstructed samples neighboring to the upper edge of the luminance compensation block corresponding to the affine block.

In a feasible implementation, the first sample set includes a predetermined quantity of neighboring reconstructed samples exactly left to the current affine block and a predetermined quantity of neighboring reconstructed samples exactly above the current affine block. Correspondingly, the second sample set includes a predetermined quantity of neighboring reconstructed samples exactly left to the luminance compensation block corresponding to the affine block and a predetermined quantity of neighboring reconstructed samples exactly above the luminance compensation block corresponding to the affine block. For example, the first sample set may include 16 neighboring reconstructed samples exactly left to the current affine block and 16 neighboring reconstructed samples exactly above the current affine block. In another example, the first sample set may include 8 neighboring reconstructed samples exactly left to the current affine block and 16 neighboring reconstructed samples exactly above the current affine block. In another example, the predetermined quantity is limited by a size of the current affine block. The quantity of neighboring samples that are in the first sample set and exactly left to the current affine block is equal to Min(vertically predetermined quantity value, affine block height value), and the quantity of neighboring samples that are in the first sample set and exactly above the current affine block is equal to Min (horizontally predetermined quantity value, affine block width value). Alternatively, in the first sample set, both the quantity of neighboring samples exactly left to the current affine block and the quantity of neighboring samples exactly above the current affine block are equal to Min(predetermined quantity value, affine block height value, affine block width value). It should be understood that the second sample set corresponds to the first sample set.

Third manner: Determine, based on a motion vector of a subblock at a second preset location in the current affine block, a luminance compensation block corresponding to the subblock at the second preset location.

Optionally, the second preset location is one or more of a left edge, an upper edge, or the upper-left corner of the current affine block.

For example, the second preset location may be the left edge of the current affine block, or the second preset location may be the upper edge of the current affine block.

For another example, the second preset location may be the left edge and the upper edge of the current affine block. In this case, the second preset location includes two locations.

In the third manner, based on different second preset locations, reconstructed samples included in the first sample set and the second sample set are also different. The following describes the reconstructed samples in different cases.

Case 1: The second preset location is the left edge of the current affine block.

In Case 1, the first sample set may include a reconstructed sample neighboring to a left edge of the subblock at the second preset location, and the second sample set may include a reconstructed sample neighboring to a left edge of the luminance compensation block corresponding to the subblock at the second preset location.

In a feasible implementation, the first sample set includes a predetermined quantity of neighboring reconstructed samples exactly left to the subblock at the second preset location. Correspondingly, the second sample set includes a predetermined quantity of neighboring reconstructed samples exactly left to the luminance compensation block corresponding to the subblock at the second preset location. For example, the predetermined quantity may be 16. In another example, the predetermined quantity is limited by a size of the subblock at the second preset location. For example, the quantity of neighboring reconstructed samples that are included in the first sample set and that are exactly left to the subblock at the second preset location is equal to a smaller value between the predetermined quantity and the width of the subblock at the second preset location. In other words, the quantity of samples in the first sample set=Min (predetermined quantity value, width value of the subblock at the second preset location). It should be understood that composition of the second sample set corresponds to composition of the first sample set.

Figure 20:
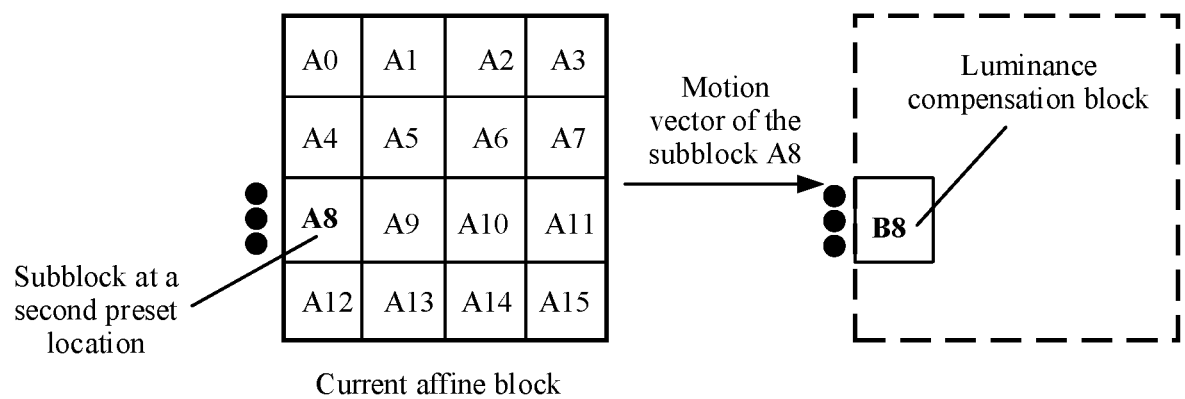
FIG. 20 is a schematic diagram of a subblock at a second preset location and a luminance compensation block corresponding to the subblock.

For example, as shown in FIG. 20, it is assumed that the subblock at the second preset location in the current affine block is A8. A luminance compensation block B8 corresponding to the subblock A8 may be obtained based on a motion vector of the subblock A8. In this case, the first sample set may include reconstructed samples neighboring to a left edge of the subblock A8, and the second sample set may include reconstructed samples neighboring to a left edge of the subblock B8.

Case 2: The second preset location is the upper edge of the current affine block.

In Case 2, the first sample set may include a reconstructed sample neighboring to an upper edge of the subblock at the second preset location, and the second sample set may include a reconstructed sample neighboring to an upper edge of the luminance compensation block corresponding to the subblock at the second preset location.

In a feasible implementation, the first sample set includes a predetermined quantity of neighboring reconstructed samples exactly above the subblock at the second preset location. Correspondingly, the second sample set includes a predetermined quantity of neighboring reconstructed samples exactly above the luminance compensation block corresponding to the subblock at the second preset location. For example, the predetermined quantity may be 16. In another example, the predetermined quantity is limited by a size of the subblock at the second preset location. For example, the quantity of neighboring reconstructed samples that are included in the first sample set and that are exactly above the subblock at the second preset location is equal to a smaller value between the predetermined quantity and the height of the subblock at the second preset location. In other words, the quantity of samples in the first sample set=Min (predetermined quantity value, height value of the subblock at the second preset location). It should be understood that composition of the second sample set corresponds to composition of the first sample set.

Figure 21:
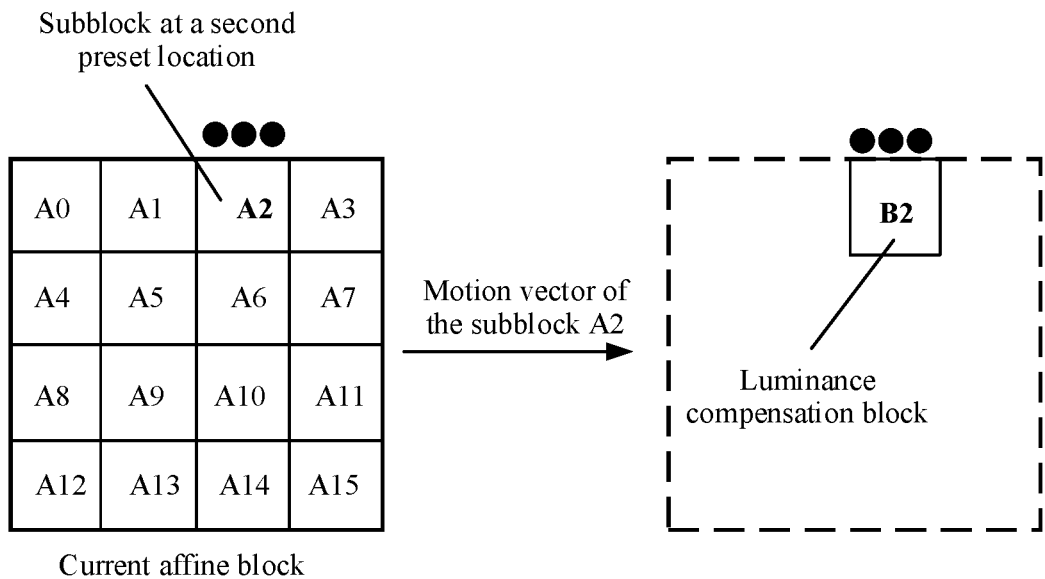
FIG. 21 is a schematic diagram of a subblock at a second preset location and a luminance compensation block corresponding to the subblock.

For example, as shown in FIG. 21, it is assumed that the subblock at the second preset location in the current affine block is A2. A luminance compensation block B2 corresponding to the subblock A2 may be obtained based on a motion vector of the subblock A2. In this case, the first sample set may include reconstructed samples neighboring to an upper edge of the subblock A2, and the second sample set may include reconstructed samples neighboring to an upper edge of the subblock B2.

Case 3: The second preset location is the left edge and the upper edge of the current affine block.

In Case 3, the first sample set may include a reconstructed sample neighboring to a left edge and a reconstructed sample neighboring to an upper edge of the subblock at the second preset location, and the second sample set may include a reconstructed sample neighboring to a left edge and a reconstructed sample neighboring to an upper edge of the luminance compensation block corresponding to the subblock at the second preset location.

In a feasible implementation, the first sample set includes a predetermined quantity of neighboring reconstructed samples exactly left to the subblock at the second preset location and a predetermined quantity of neighboring reconstructed samples exactly above the subblock at the second preset location. Correspondingly, the second sample set includes a predetermined quantity of neighboring reconstructed samples exactly left to the luminance compensation block corresponding to the subblock at the second preset location and a predetermined quantity of neighboring reconstructed samples exactly above the luminance compensation block corresponding to the subblock at the second preset location. For example, the first sample set may include 16 neighboring reconstructed samples exactly left to the subblock at the second preset location and 16 neighboring reconstructed samples exactly above the subblock at the second preset location. In another example, the first sample set may include 8 neighboring reconstructed samples exactly left to the subblock at the second preset location and 16 neighboring reconstructed samples exactly above the subblock at the second preset location. In another example, the predetermined quantity is limited by a size of the subblock at the second preset location. The quantity of neighboring samples that are in the first sample set and exactly left to the subblock at the second preset location is equal to Min (vertically predetermined quantity value, height value of the subblock at the second preset location), and the quantity of neighboring samples that are in the first sample set and exactly above the subblock at the second preset location is equal to Min(horizontally predetermined quantity value, width value of the subblock at the second preset location). Alternatively, in the first sample set, both the quantity of neighboring samples exactly left to the subblock at the second preset location and the quantity of neighboring samples exactly above the subblock at the second preset location are equal to Min(predetermined quantity value, height value of the subblock at the second preset location, width value of the subblock at the second preset location). It should be understood that the second sample set corresponds to the first sample set.

Figure 22:
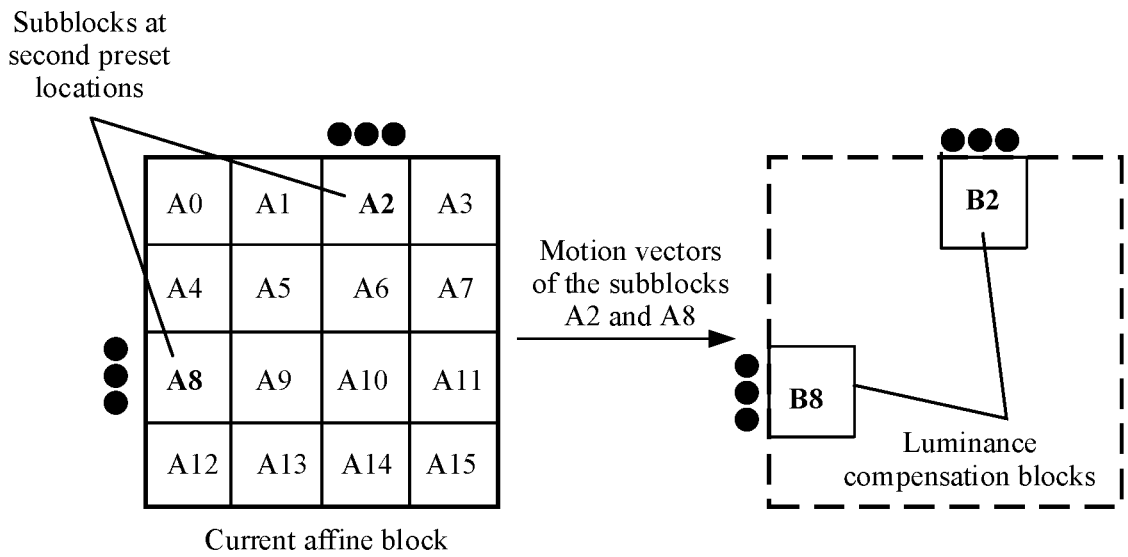
FIG. 22 is a schematic diagram of a subblock at a second preset location and a luminance compensation block corresponding to the subblock.

For example, as shown in FIG. 22, it is assumed that subblocks at second preset locations in the current affine block are A2 and A8, and luminance compensation blocks B2 and B8 corresponding to the subblocks A2 and A8 may be obtained based on motion vectors of the subblocks A2 and A8. In this case, the first sample set may include reconstructed samples neighboring to an upper edge of the subblock A2 and reconstructed samples neighboring to a left edge of the subblock A8. The second sample set may include reconstructed samples neighboring to an upper edge of the subblock B2 and reconstructed samples neighboring to a left edge of the subblock B8.

Case 4: The second preset location is the upper-left corner of the current affine block.

In Case 4, the first sample set includes a reconstructed sample neighboring to a left edge and/or a reconstructed sample neighboring to an upper edge of the subblock at the second preset location, and the second sample set includes a reconstructed sample neighboring to a left edge and/or a reconstructed sample neighboring to an upper edge of the luminance compensation block corresponding to the subblock at the second preset location.

Figure 23:
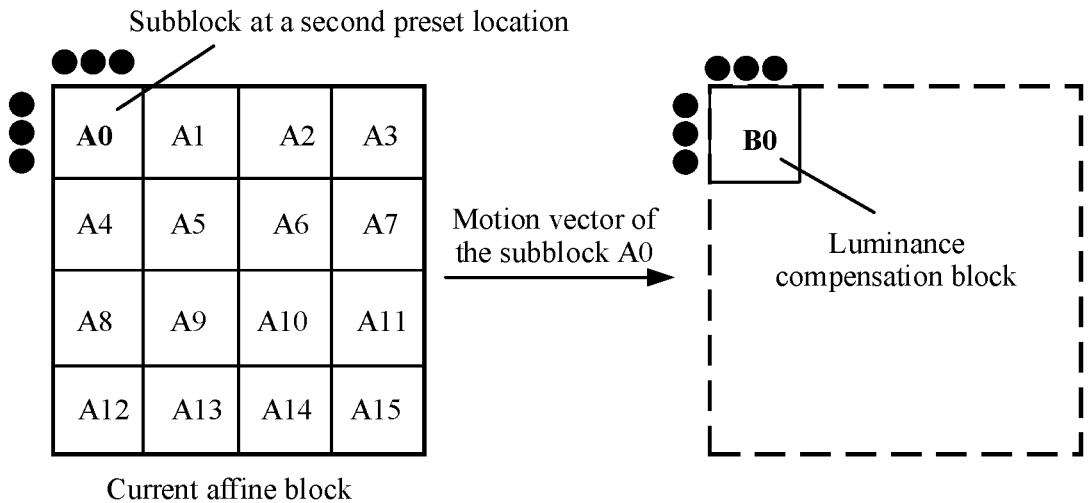
FIG. 23 is a schematic diagram of a subblock at a second preset location and a luminance compensation block corresponding to the subblock.

For example, as shown in FIG. 23, it is assumed that the subblock at the second preset location in the current affine block is A0. A luminance compensation block B0 corresponding to the subblock A0 may be obtained based on a motion vector of the subblock A0. In this case, the first sample set may include reconstructed samples neighboring to a left edge and reconstructed samples neighboring to an upper edge of the subblock A0, and the second sample set may include reconstructed samples neighboring to a left edge and reconstructed samples neighboring to an upper edge of the subblock B0.

It should be understood that FIG. 23 is merely an example. Actually, when the subblock at the second preset location is A0, the first sample set may include only the reconstructed samples neighboring to the left edge of the subblock A0, and the second sample set may include the reconstructed samples neighboring to the left edge of the subblock B0. Alternatively, when the subblock at the second preset location is A0, the first sample set may include only the reconstructed samples neighboring to the upper edge of the subblock A0, and the second sample set may include the reconstructed samples neighboring to the upper edge of the subblock B0.

In this disclosure, the linear model coefficient obtained in operation 1003 does not need to be transmitted between an encoder side and a decoder side, and both the encoder side and the decoder side may derive the linear model coefficient based on the first sample set and the second sample set.

Figure 24:
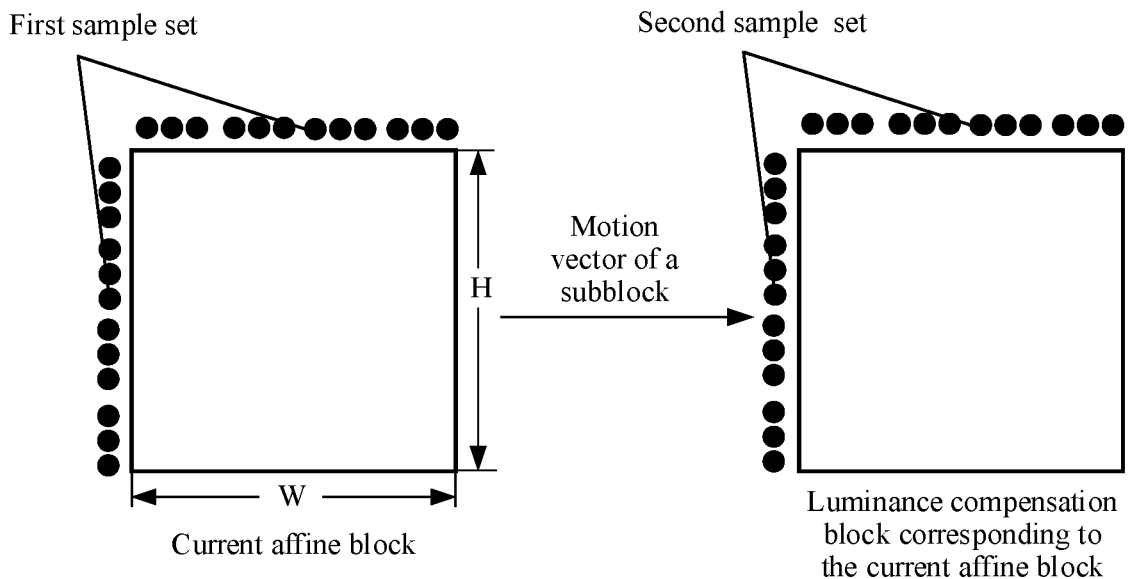
FIG. 24 is a schematic diagram of a current affine block and a luminance compensation block corresponding to the current affine block.

FIG. 24 is used as an example. FIG. 24 shows the current affine block and the luminance compensation block corresponding to the current affine block. The luminance compensation block corresponding to the current affine block is obtained by performing motion compensation on a subblock at a location in the current affine block (for example, the upper-left corner of the current affine block).

In FIG. 24, a size of the current affine block is W×H. The first sample set includes the reconstructed samples neighboring to the left edge and the reconstructed samples neighboring to the upper edge of the current affine block, and the second sample set includes the reconstructed samples neighboring to the left edge and the reconstructed samples neighboring to the upper edge of the luminance compensation block of the current affine block. The reconstructed samples in the first sample set are in a one-to-one correspondence with the reconstructed samples in the second sample set.

It is assumed that the first sample set and the second sample set each include N samples, $C(n)$ is a sample value of an $n^{th}$ sample in the reconstructed samples neighboring to the left edge and the reconstructed samples neighboring to the upper edge of the current affine block, and $R(n)$ is a sample value of an $n^{th}$ sample in the reconstructed samples neighboring to the left edge and the reconstructed samples neighboring to the upper edge of the luminance compensation block of the current affine block. In this case, linear model coefficients $\alpha$ and $\beta$ may be determined according to a formula (7) and a formula (8).

$$\alpha = \frac{N * \sum (C(n)*R(n)) - \sum C(n) * \sum R(n)}{N * \sum (R(n)*R(n)) - \sum R(n) * \sum R(n)} \quad (7)$$

$$\beta = \frac{\sum C(n) - a * \sum R(n)}{N} \quad (8)$$

It should be understood that, before the model coefficients are derived, the luminance compensation block corresponding to each subblock in the current affine block may be obtained in another manner. (Refer to the foregoing first manner and third manner.) After the first sample set and the second sample set are obtained, the foregoing formula (7) and formula (8) may be used to determine the linear model coefficients $\alpha$ and $\beta$.

1004: Update the predicted sample value of the current affine block based on the linear model coefficient, to obtain an updated predicted sample value of the current affine block.

In operation 1004, updating the predicted sample value of the current affine block based on the linear model coefficient may also be understood as performing luminance compensation (local illumination compensation) (where the local illumination compensation technology is used to perform local illumination compensation on the predicted sample value of the current affine block) on the predicted sample value of the current affine block based on the linear model coefficient, to obtain a predicted sample value obtained after luminance compensation (local illumination compensation) is performed on the current affine block. To avoid confusion, descriptions in operation 1004 are used for the following related content.

In operation 1004, the updated predicted sample value of the current affine block may be specifically determined according to a formula (9).

$$pred\_C(i,j) = \alpha \times rec\_C(i,j) + \beta \quad (9)$$

In the formula (9), pred_c(i, j) is an updated predicted sample value at a location (i, j) in the current affine block, rec_c(i, j) is a predicted sample value at the location (i, j) in the current affine block, and $\alpha$ and $\beta$ are linear model coefficients.

rec_c(i, j) may alternatively be understood as a reconstructed sample value at a location (i, j) in a reference block corresponding to the current affine block (where a reference subblock corresponding to each subblock in the current affine block may be obtained based on the motion vector of each subblock, to obtain the reference block corresponding to the current affine block). The reconstructed sample value at the location (i, j) in the reference block corresponding to the current affine block may be used as the predicted sample value at the location (i, j) in the current affine block.

In this disclosure, luminance compensation is performed on the predicted sample value of the current affine block, to improve accuracy of inter prediction, reduce a residual value, and when video quality is the same, reduce a bit rate, to further improve coding performance.

Specifically, because there may be a luminance difference between the current affine block and the reference block of the current affine block, a predicted sample value that is of the current affine block and that is obtained based on the reference block may have some differences from an actual sample value of the current affine block. Therefore, the linear model coefficient is derived, and a sample value of the current affine block is updated based on the linear model coefficient, so that the updated predicted sample value is closer to the actual sample value of the current affine block. In this way, a residual value between the actual sample value of the current affine block and the updated predicted sample value of the current affine block can be reduced, so that the bit rate can be reduced when the video quality is the same, and coding performance can further be improved.

The method shown in FIG. 11 may be a video encoding method (performed by a device at the encoder side) or a video decoding method (performed by a device at the decoder side).

When the method shown in FIG. 11 is a video decoding method, before the one or more luminance compensation blocks are determined based on the motion vectors of the one or more subblocks of the current affine block, the method shown in FIG. 11 further includes: decoding a bitstream to obtain first identification information, where the first identification information is used to indicate to perform luminance compensation on the current affine block.

Optionally, an LIC flag being 1 indicates the first identification information, and indicates that luminance compensation should be performed on the current affine block.

Optionally, an LIC flag being 0) indicates second identification information, and indicates that luminance compensation does not need to be performed on the current affine block.

When the foregoing method is a decoding method, if the second identification information is obtained by decoding the bitstream, it is determined that luminance compensation does not need to be performed on the current affine block, and an inter prediction process is completed after the predicted sample value of the current affine block is obtained.

When the method shown in FIG. 11 is a video encoding method, the method shown in FIG. 11 further includes: generating first identification information, where the first identification information is used to indicate that luminance compensation should be performed on the current affine block: and encoding the first identification information to generate a bitstream.

In this disclosure, the first identification information is encoded, so that the decoder side can obtain the first identification information through decoding in a decoding process, and then perform luminance compensation on the affine block in an inter prediction process.

In addition, when the method shown in FIG. 11 is a video encoding method, before the predicted sample value of the current affine block is updated, determining may further be performed first based on an actual requirement, to determine whether the predicted sample value of the current affine block should be updated (in other words, determining whether to perform local illumination compensation on the current affine block).

The foregoing describes in detail the inter prediction method in the embodiments of this disclosure with reference to the accompanying drawings. To better understand a related procedure of the inter prediction method in the embodiments of this disclosure, the following describes in detail processes of the inter prediction method in the embodiments of this disclosure with reference to specific embodiments.

Embodiment 1: Determine, based on the motion vector of each subblock in the current affine block, the luminance compensation block corresponding to each subblock; and determine the linear model coefficient based on the reconstructed sample neighboring to the left edge and the reconstructed sample neighboring to the upper edge of the current affine block, and the reconstructed sample neighboring to the left edge and the reconstructed sample neighboring to the upper edge of the virtual luminance compensation block formed by the plurality of luminance compensation blocks.

In Embodiment 1, a process of obtaining the updated predicted sample value of the current affine block includes operations 2001 to 2004. These operations are described in detail below.

2001: Determine a motion vector of a control point of the current affine block.

In operation 2001, the motion vector of the control point of the current block may be inherited or analytically derived from the bitstream. A manner in which the control point motion vector can be obtained falls within the protection scope of this disclosure. This is not specifically limited in this disclosure.

2002: Determine the motion vector of each subblock in the current affine block.

Specifically, in operation 2002, the motion vector of each subblock in the current affine block may be determined based on motion information of the control point of the current affine block and an affine motion model used by the current affine block.

2003: Perform motion compensation based on the motion vector of each subblock in the current affine block, to obtain the predicted sample value of each subblock.

After operation 2003, the encoder side may determine, based on an actual requirement, whether local illumination compensation should be performed on the current affine block.

After operation 2003, the decoder side may decode the bitstream to obtain the LIC flag. The LIC flag being 1 indicates that LIC compensation should be performed on the current affine block, and operation 2004 further should be performed. The updated predicted sample value, obtained in operation 2004, of the current affine block is a final predicted sample value of the current affine block. The LIC flag being 0 indicates that LIC compensation does not need to be performed on the current affine block, and the predicted sample value, obtained in operation 2003, of the current affine block is a final predicted sample value of the current affine block.

2004: Perform LIC compensation on the current affine block.

Specifically, in operation 2004, a linear model should be first obtained, and then LIC compensation is performed on the current affine block according to the linear model. A specific process may include operation 1 to operation 3.

Operation 1: Obtain a template of the linear model.

The template refers to a set of sample values used to derive linear model coefficients for LIC compensation. The template herein includes a template (which is equivalent to the reconstructed sample neighboring to the edge of the current affine block in the foregoing description) of the current affine block and a template (which is equivalent to the reconstructed sample neighboring to the edge of the virtual luminance compensation block in the foregoing description) of the virtual luminance compensation block.

Figure 25:
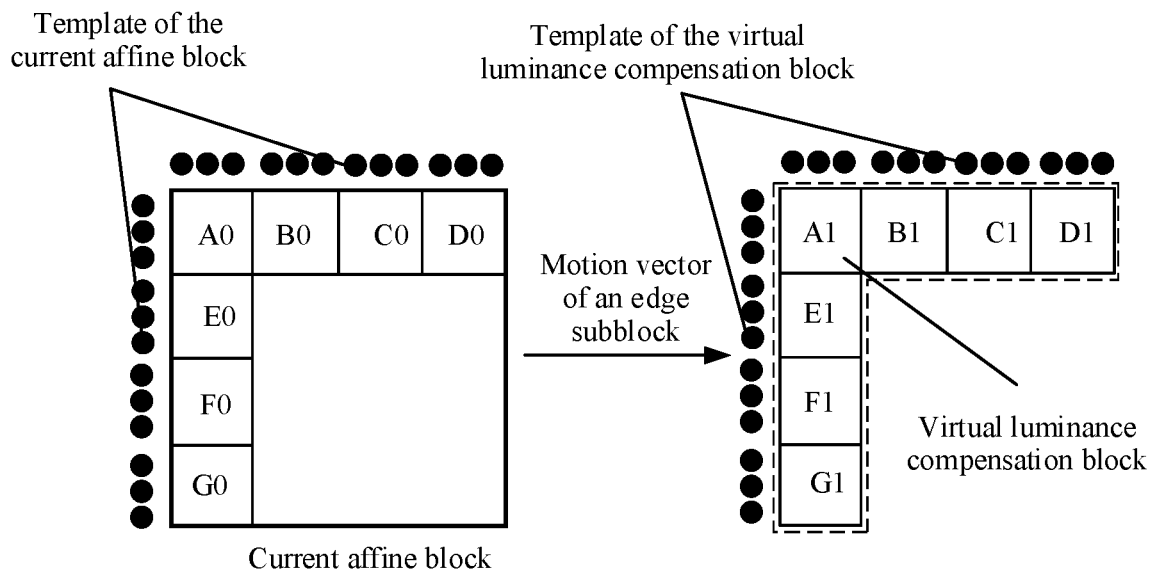
FIG. 25 is a schematic diagram of a template of a current affine block and a template of a virtual luminance compensation block.

Specifically, as shown in FIG. 25, the current affine block includes subblocks A0 to G0 located on the upper edge and the left edge, and the virtual luminance compensation block corresponding to the current affine block includes luminance compensation blocks A1 to G1 located on the upper edge and the left edge (where the luminance compensation blocks A1 to G1 form the upper edge and the left edge of the virtual luminance compensation block). A0 to G0 in the current affine block respectively correspond to A1 to G1 in the virtual luminance compensation block.

When the virtual luminance compensation block is obtained based on the current affine block, motion compensation may first be performed based on a motion vector of each subblock in the subblocks on the left edge and the upper edge of the current affine block, to obtain the luminance compensation blocks A1 to G1. Then, the luminance compensation blocks A1 to G1 are spliced into the virtual luminance compensation block. For details, refer to the manner shown in FIG. 12 for splicing.

As shown in FIG. 25, the template of the current affine block includes upper edge samples of subblocks on the upper edge of the current affine block (reconstructed samples neighboring to upper edges of the subblocks on the upper edge of the current affine block) and left edge samples of subblocks on the left edge of the current affine block (reconstructed samples neighboring to left edges of the subblocks on the left edge of the current affine block). The template of the virtual luminance compensation block includes upper edge samples of subblocks on the upper edge of the virtual luminance compensation block (reconstructed samples neighboring to upper edges of the subblocks on the upper edge of the virtual luminance compensation block) and left edge samples of subblocks on the left edge of the virtual luminance compensation block (reconstructed samples neighboring to left edges of the subblocks on the left edge of the virtual luminance compensation block).

It should be understood that, in FIG. 25, the virtual luminance compensation block is not a real picture block that needs to be constructed, but may be a reference object for determining a template of a luminance compensation block corresponding to an edge subblock in the current affine block. In FIG. 25, luminance compensation blocks corresponding to edge subblocks of the current affine block are A1 to G1, and a template of these luminance compensation blocks includes reconstructed samples neighboring to an upper edge of each of the luminance compensation blocks A1 to D1 and reconstructed samples neighboring to a left edge of each of the luminance compensation blocks A1, E1, F1, and G1.

Operation 2: Determine the linear model coefficients $\alpha$ and $\beta$ used for LIC compensation.

The linear model coefficients $\alpha$ and $\beta$ used for LIC compensation may be derived based on the template of the current affine block and the template of the virtual compensation block that are obtained in operation 1.

Specifically, the linear model coefficients $\alpha$ and $\beta$ may be derived based on the template of the current affine block and the template of the virtual compensation block that are obtained in operation 1 by using the foregoing formula (7) and formula (8).

Operation 3: Perform compensation on the predicted sample value of the current affine block based on the linear model coefficients $\alpha$ and $\beta$, to obtain a predicted sample value obtained after luminance compensation.

Specifically, in operation 3, compensation may be performed on the predicted sample value of the current affine block according to the foregoing formula (9), to obtain the predicted sample value (which is equivalent to the updated predicted sample value of the current affine block in the foregoing description) that is obtained after luminance compensation and that is of the current affine block.

Embodiment 2: Determine, based on a motion vector of the subblock in the upper-left corner of the current affine block, the luminance compensation block corresponding to the current affine block: and determine the linear model coefficient based on the reconstructed sample neighboring to the left edge and the reconstructed sample neighboring to the upper edge of the current affine block, and the reconstructed sample neighboring to the left edge and the reconstructed sample neighboring to the upper edge of the luminance compensation block corresponding to the current affine block.

In Embodiment 2, a process of obtaining the updated predicted sample value of the current affine block includes operations 3001 to 3005. These operations are described in detail below.

3001: Determine the predicted sample value of each subblock in the current affine block.

Specifically, in operation 3001, motion information of each subblock may be determined based on motion information of a control point of the current affine block, and then motion compensation is performed on each subblock based on the motion information of each subblock, to obtain the predicted sample value of each subblock.

3002: Use motion information of a subblock in the upper-left corner of the current affine block as motion information of the current affine block, and perform motion compensation on the current affine block based on the motion information, to obtain the luminance compensation block corresponding to the current affine block.

Figure 26:
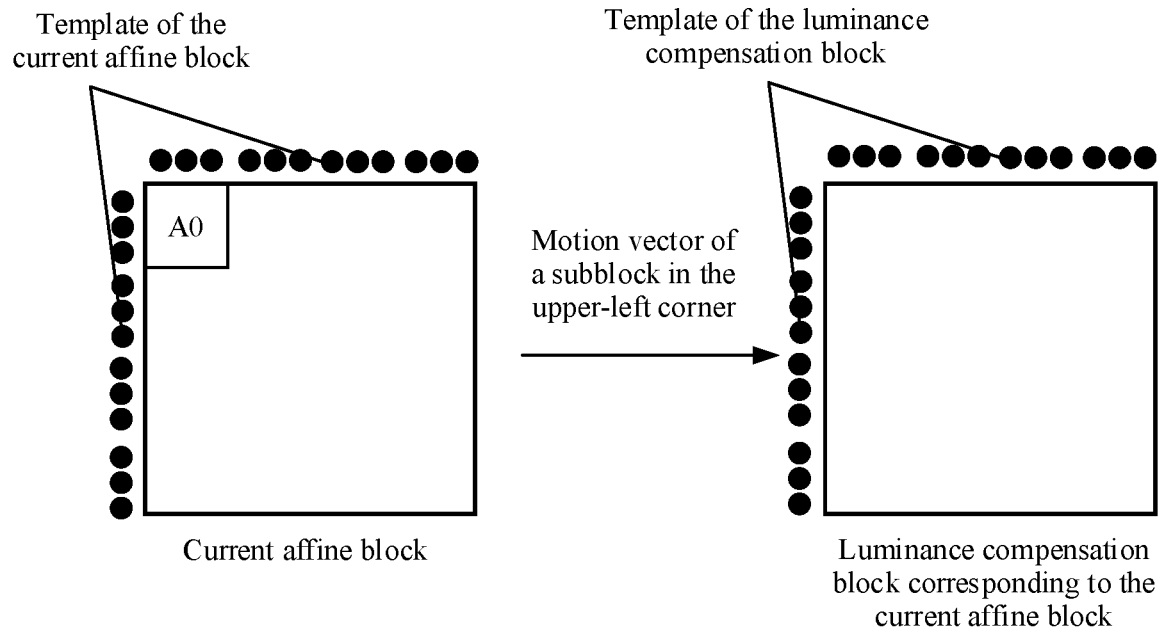
FIG. 26 is a schematic diagram of a template of a current affine block and a template of a luminance compensation block corresponding to the current affine block.

As shown in FIG. 26, motion compensation is performed by using a motion vector of the subblock in the upper-left corner of the current affine block as a motion vector of the current affine block, to obtain the virtual luminance compensation block corresponding to the current affine block.

Optionally, in operation 3002, motion compensation may be performed by alternatively using motion information of a subblock in the center of the current affine block as the motion information of the current affine block, to obtain the luminance compensation block corresponding to the current affine block.

3003: Obtain a template of a linear model.

As shown in FIG. 26, a template of the current affine block includes upper edge samples of subblocks on the upper edge of the current affine block and left edge samples of subblocks on the left edge of the current affine block. A template of the luminance compensation block corresponding to the current affine block includes upper edge samples of subblocks on the upper edge of the luminance compensation block and left edge samples of subblocks on the left edge of the luminance compensation block.

3004: Determine the linear model coefficients $\alpha$ and $\beta$ used for LIC compensation.

Specifically, derivation may be performed based on the template of the current affine block and the template of the luminance compensation block corresponding to the current affine block that are determined in operation 3003.

3005: Perform compensation on the predicted sample value of the current affine block based on the linear model coefficients $\alpha$ and $\beta$, to obtain a predicted sample value obtained after luminance compensation.

Embodiment 3: Determine, based on a motion vector of the subblock in the upper-left corner of the current affine block, a luminance compensation block corresponding to the subblock in the upper-left corner of the current affine block; and determine the linear model coefficient based on a reconstructed sample neighboring to a left edge and a reconstructed sample neighboring to an upper edge of the subblock in the upper-left corner of the current affine block, and a reconstructed sample neighboring to a left edge and a reconstructed sample neighboring to an upper edge of the luminance compensation block corresponding to the subblock in the upper-left corner of the current affine block.

In Embodiment 3, a process of obtaining the updated predicted sample value of the current affine block includes operations 4001 to 4005. These operations are described in detail below.

4001: Determine the predicted sample value of each subblock in the current affine block.

Specifically, for a specific process of operation 4001, refer to operation 3001.

4002: Perform, based on motion information of the subblock in the upper-left corner of the current affine block, motion compensation on the subblock in the upper-left corner of the current affine block, to obtain the luminance compensation block corresponding to the subblock in the upper-left corner.

Figure 27:
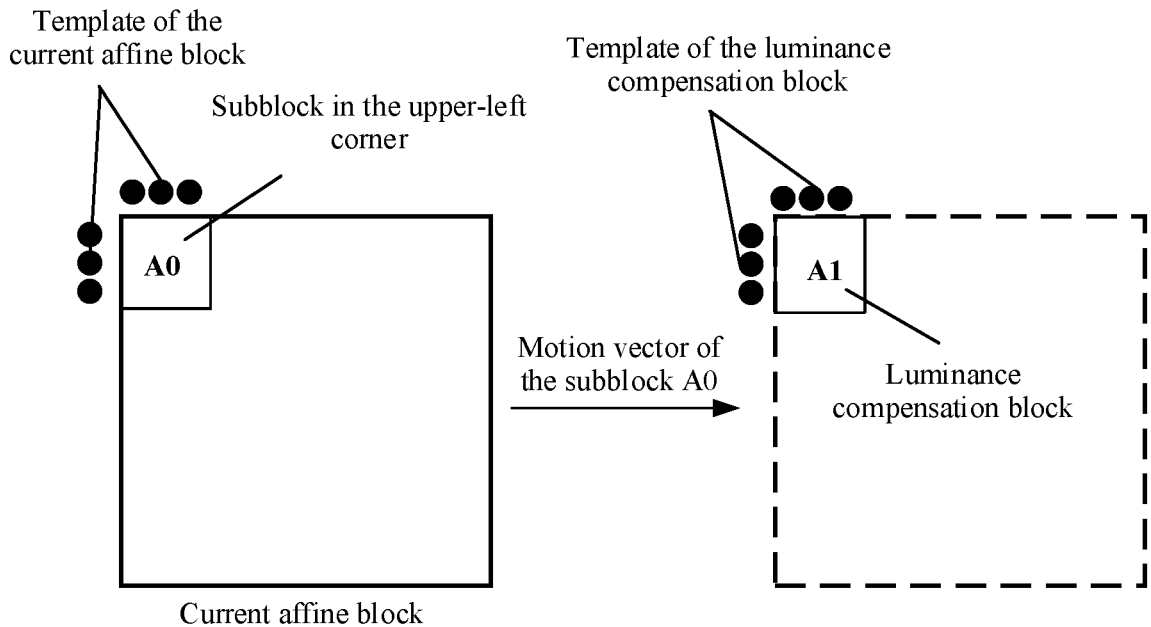
FIG. 27 is a schematic diagram of a template of a current affine block and a template of a luminance compensation block.

As shown in FIG. 27, motion compensation is performed based on motion information of a subblock A0 in the upper-left corner of the current affine block, to obtain a luminance compensation block A1 corresponding to the subblock A0.

4003: Obtain a template of a linear model.

As shown in FIG. 27, a template of the current affine block includes upper edge samples and left edge samples of the subblock A0, and a template of the luminance compensation block A1 includes left edge samples and upper edge samples of A1.

4004: Determine the linear model coefficients $\alpha$ and $\beta$ used for LIC compensation.

Specifically, derivation may be performed based on the template of the subblock A0 and the template of the luminance compensation block A1 that are determined in operation 3003.

4005: Perform compensation on the predicted sample value of the current affine block based on the linear model coefficients $\alpha$ and $\beta$, to obtain a predicted sample value obtained after luminance compensation.

The foregoing describes in detail the video decoding method and the video encoding method in the embodiments of this disclosure with reference to the accompanying drawings. The following separately describes an inter prediction apparatus in the embodiments of this disclosure with reference to FIG. 28 and FIG. 29. It should be understood that the inter prediction apparatuses shown in FIG. 28 and FIG. 29 can perform operations in the video decoding method in the embodiments of this disclosure. To avoid unnecessary repetition, the following appropriately omits repeated descriptions when describing the inter prediction apparatus in the embodiments of this disclosure.

Figure 28:
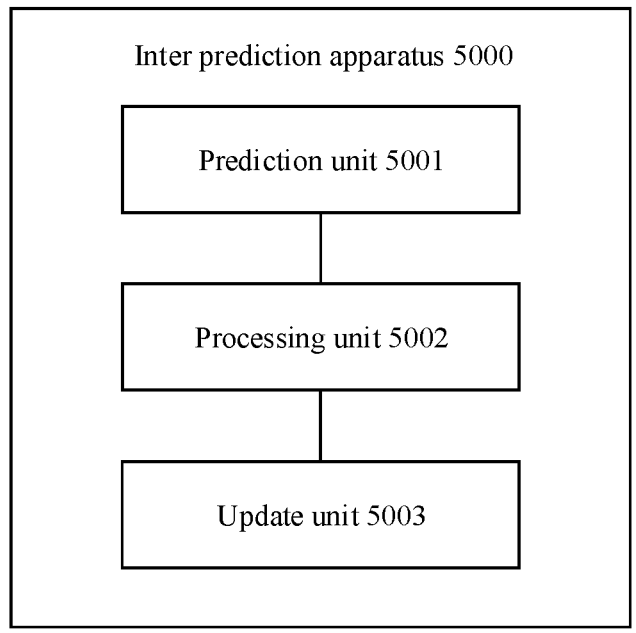
FIG. 28 is a schematic block diagram of an inter prediction apparatus according to an embodiment of this disclosure.

FIG. 28 is a schematic block diagram of an inter prediction apparatus according to an embodiment of this disclosure. An inter prediction apparatus 5000 shown in FIG. 28 includes:

a prediction unit 5001, configured to obtain a predicted sample value of a current affine block;

a processing unit 5002, where the processing unit 5002 is configured to:

determine one or more luminance compensation blocks based on motion vectors of one or more subblocks of the current affine block, and determine a linear model coefficient based on a first sample set and a second sample set, where the first sample set includes at least one reconstructed sample neighboring to an edge of the current affine block, the second sample set includes at least one reconstructed sample neighboring to an edge of the one or more luminance compensation blocks, and the sample in the first sample set is in a one-to-one correspondence with the sample in the second sample set: and an update unit 5003, configured to update the predicted sample value of the current affine block based on the linear model coefficient, to obtain an updated predicted sample value of the current affine block.

In this disclosure, luminance compensation is performed on the predicted sample value of the current affine block, to improve accuracy of inter prediction, reduce a residual value, and when video quality is the same, reduce a bit rate, to further improve coding performance.

The inter prediction apparatus 5000 may be either an encoding device or a decoding device.

When the inter prediction apparatus 5000 is an encoding device, the prediction unit 5001, the processing unit 5002, and the update unit 5003 in the inter prediction apparatus 5000 may correspond to the inter prediction unit 244 in the encoder 20 shown in FIG. 2. The inter prediction unit 244 can perform operations performed by the inter prediction apparatus 5000.

When the inter prediction apparatus 5000 is a decoding device, the prediction unit 5001, the processing unit 5002, and the update unit 5003 in the inter prediction apparatus 5000 may correspond to the inter prediction unit 344 in the decoder 30 shown in FIG. 3. The inter prediction unit 344 can perform operations performed by the inter prediction apparatus 5000.

In addition, the inter prediction apparatus 5000 may alternatively be referred to as a coding device or a codec, and the inter prediction apparatus 5000 can implement encoding or decoding of a video picture.

Figure 29:
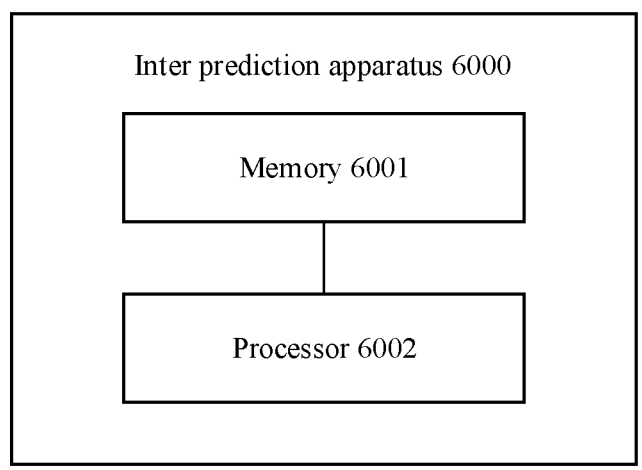
FIG. 29 is a schematic block diagram of an inter prediction apparatus according to an embodiment of this disclosure.

FIG. 29 is a schematic block diagram of an inter prediction apparatus according to an embodiment of this disclosure. An inter prediction apparatus 6000 shown in FIG. 29 includes:

a memory 6001, configured to store a program: and a processor 6002, configured to execute program stored in the memory 6001, where when the program stored in the memory 6001 is executed, the processor 6002 is configured to:

obtain a predicted sample value of a current affine block, determine one or more luminance compensation blocks based on motion vectors of one or more subblocks of the current affine block, and determine a linear model coefficient based on a first sample set and a second sample set, where the first sample set includes at least one reconstructed sample neighboring to an edge of the current affine block, the second sample set includes at least one reconstructed sample neighboring to an edge of the one or more luminance compensation blocks, and the sample in the first sample set is in a one-to-one correspondence with the sample in the second sample set, and update the predicted sample value of the current affine block based on the linear model coefficient, to obtain an updated predicted sample value of the current affine block.

The prediction unit 5001, the processing unit 5002, and the update unit 5003 in the inter prediction apparatus 5000 may correspond to the processor 6002 in the inter prediction apparatus 6000. The processor 6002 can implement functions of the prediction unit 5001, the processing unit 5002, and the update unit 5003 in the inter prediction apparatus 5000.

In addition, similar to the inter prediction apparatus 5000, the inter prediction apparatus 6000 may be either an encoding device or a decoding device.

When the inter prediction apparatus 6000 is an encoding device, the processor 6002 in the inter prediction apparatus 6000 may correspond to the inter prediction unit 244 in the encoder 20 shown in FIG. 2. The inter prediction unit 244 can perform operations performed by the processor 6002 in the inter prediction apparatus 6000.

When the inter prediction apparatus 6000 is a decoding device, the processor 6002 in the inter prediction apparatus 6000 may correspond to the inter prediction unit 344 in the decoder 30 shown in FIG. 3. The inter prediction unit 344 can perform operations performed by the processor 6002 in the inter prediction apparatus 6000.

Similarly, the inter prediction apparatus 6000 may alternatively be referred to as a coding device or a codec, and the inter prediction apparatus 6000 can implement encoding or decoding of a video picture.

A person of ordinary skill in the art may be aware that units, algorithms, and operations in the examples described with reference to the embodiments disclosed in this disclosure can be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond a scope of this disclosure.

It may be clearly understood by a person skilled in the art that, for convenient and brief description, for a detailed working process of the foregoing system, apparatus, and units, refer to a corresponding process in the foregoing method embodiments, and details are not described herein again.

In the several embodiments provided in this disclosure, it should be understood that the disclosed system, apparatus, and method may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, functional units in the embodiments of this disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this disclosure. The foregoing storage medium includes any medium that can store program code, for example, a USB flash drive, a removable hard disk, a read-only memory (ROM), a random access memory (RAM), a magnetic disk, or an optical disc.

The foregoing description is merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method, comprising:
    obtaining a predicted sample value of a current affine block;
    determining one or more luminance compensation blocks based on motion vectors of one or more subblocks of the current affine block;
    determining a linear model coefficient based on a first sample set and a second sample set, wherein the first sample set comprises at least one reconstructed sample neighboring to an edge of the current affine block, the second sample set comprises at least one reconstructed sample neighboring to an edge of the one or more luminance compensation blocks, and each sample in the first sample set is in a one-to-one correspondence with a corresponding sample in the second sample set, wherein the second sample set comprises a reconstructed sample at a specific neighboring location of each of the one or more luminance compensation blocks, the one or more luminance compensation blocks comprise one or more of a first-type luminance compensation block and a second-type luminance compensation block, the first-type luminance compensation block comprises a luminance compensation block corresponding to a subblock on an upper edge of the current affine block, the second-type luminance compensation block comprises a luminance compensation block corresponding to a subblock on a left edge of the current affine block; and updating the predicted sample value of the current affine block based on the linear model coefficient, to obtain an updated predicted sample value of the current affine block.

2. The method of claim 1, wherein determining the one or more luminance compensation blocks based on the motion vectors of the one or more subblocks of the current affine block comprises:

determining, based on a corresponding motion vector of each of the one or more subblocks of the current affine block, a luminance compensation block corresponding to each subblock, to obtain the one or more luminance compensation blocks.

3. The method of claim 2, wherein the first sample set comprises one or more of a reconstructed sample neighboring to the left edge and a reconstructed sample neighboring to the upper edge of the current affine block.

4. The method of claim 2, wherein a reconstructed sample at a specific neighboring location of the first-type luminance compensation block comprises a reconstructed sample neighboring to an upper edge of the first-type luminance compensation block, and a reconstructed sample at a specific neighboring location of the second-type luminance compensation block comprises a reconstructed sample neighboring to a left edge of the second-type luminance compensation block.

5. The method of claim 1, wherein determining the one or more luminance compensation blocks based on the motion vectors of the one or more subblocks of the current affine block comprises:

determining, based on a first motion vector of a first subblock at a first preset location in the current affine block, a luminance compensation block corresponding to the current affine block.

6. The method of claim 5, wherein the first preset location is an upper-left corner or a center of the current affine block.

7. The method of claim 5, wherein the first sample set comprises one or more of a reconstructed sample neighboring to a left edge and a reconstructed sample neighboring to an upper edge of the current affine block, and the second sample set comprises one or more of a reconstructed sample neighboring to a left edge and a reconstructed sample neighboring to an upper edge of the luminance compensation block corresponding to the current affine block.

8. The method of claim 1, wherein determining the one or more luminance compensation blocks based on the motion vectors of the one or more subblocks of the current affine block comprises:

determining, based on a second motion vector of a second subblock at a second preset location in the current affine block, a luminance compensation block corresponding to the subblock at the second preset location.

9. The method of claim 8, wherein the second preset location is one or more of a left edge and an upper edge of the current affine block, the first sample set comprises a reconstructed sample neighboring to one or more of a left edge and a reconstructed sample neighboring to an upper edge of the subblock at the second preset location, and the second sample set comprises one or more of a reconstructed sample neighboring to a left edge and a reconstructed sample neighboring to an upper edge of the luminance compensation block corresponding to the subblock at the second preset location.

10. The method of claim 8, wherein the second preset location is an upper-left corner of the current affine block, the first sample set comprises one or more of a reconstructed sample neighboring to a left edge and a reconstructed sample neighboring to an upper edge of the subblock at the second preset location, and the second sample set comprises one or more of a reconstructed sample neighboring to a left edge and a reconstructed sample neighboring to an upper edge of the luminance compensation block corresponding to the subblock at the second preset location.

11. The method of claim 1, wherein the method is a video decoding method, and before the determining the one or more luminance compensation blocks based on the motion vectors of the one or more subblocks of the current affine block, the method further comprises:

decoding a bitstream to obtain first identification information, wherein the first identification information indicates that luminance compensation will be performed on the current affine block.

12. The method of claim 1, wherein the updated predicted sample value of the current affine block is obtained based:

$$\text{pred\_c}(i,j) = \alpha \times \text{rec\_c}(i,j) + \beta, \text{ wherein}$$

pred_c(i, j) is an updated predicted sample value at a location (i, j) in the current affine block, rec_c(i, j) is a predicted sample value at the location (i, j) in the current affine block, and α and β are linear model coefficients.

13. A video coding device, comprising:
a memory containing instructions; and
a processor in communication with the memory and upon execution of the instructions, is configured to:
obtain a predicted sample value of a current affine block;
determine one or more luminance compensation blocks based on motion vectors of one or more subblocks of the current affine block;
determine a linear model coefficient based on a first sample set and a second sample set, wherein the first sample set comprises at least one reconstructed sample neighboring to an edge of the current affine block, the second sample set comprises at least one reconstructed sample neighboring to an edge of the one or more luminance compensation blocks, and each sample in the first sample set is in a one-to-one correspondence with a corresponding sample in the second sample set, wherein the second sample set comprises a reconstructed sample at a specific neighboring location of each of the one or more luminance compensation blocks, the one or more luminance compensation blocks comprise one or more of a first-type luminance compensation block and a second-type luminance compensation block, the first-type luminance compensation block comprises a luminance compensation block corresponding to a subblock on an upper edge of the current affine block, the second-type luminance compensation block comprises a luminance compensation block corresponding to a subblock on a left edge of the current affine block; and update the predicted sample value of the current affine block based on the linear model coefficient, to obtain an updated predicted sample value of the current affine block.

14. The device of claim 13, wherein determining the one or more luminance compensation blocks based on the motion vectors of the one or more subblocks of the current affine block comprises:

determining, based on a corresponding motion vector of each of the one or more subblocks of the current affine block, a luminance compensation block corresponding to each subblock, to obtain the one or more luminance compensation blocks.

15. The device of claim 14, wherein the first sample set comprises one or more of a reconstructed sample neighboring to the left edge and a reconstructed sample neighboring to the upper edge of the current affine block.

16. The device of claim 14, wherein a reconstructed sample at a specific neighboring location of the first-type luminance compensation block comprises a reconstructed sample neighboring to an upper edge of the first-type luminance compensation block, and a reconstructed sample at a specific neighboring location of the second-type luminance compensation block comprises a reconstructed sample neighboring to a left edge of the second-type luminance compensation block.

17. The device of claim 13, wherein the determining the one or more luminance compensation blocks based on the motion vectors of the one or more subblocks of the current affine block comprises:

determining, based on a first motion vector of a first subblock at a first preset location in the current affine block, a luminance compensation block corresponding to the current affine block.

18. The device of claim 17, wherein the first preset location is an upper-left corner or a center of the current affine block.

19. The device of claim 17, wherein the first sample set comprises one or more of a reconstructed sample neighboring to a left edge and a reconstructed sample neighboring to an upper edge of the current affine block, and the second sample set comprises one or more of a reconstructed sample neighboring to a left edge and a reconstructed sample neighboring to an upper edge of the luminance compensation block corresponding to the current affine block.

20. A non-transitory computer-readable media storing computer instructions that when executed by one or more processors, cause the one or more processors to perform operations comprising:

obtaining a predicted sample value of a current affine block;

determining one or more luminance compensation blocks based on motion vectors of one or more subblocks of the current affine block;

determining a linear model coefficient based on a first sample set and a second sample set, wherein the first sample set comprises at least one reconstructed sample neighboring to an edge of the current affine block, the second sample set comprises at least one reconstructed sample neighboring to an edge of the one or more luminance compensation blocks, and each sample in the first sample set is in a one-to-one correspondence with a corresponding sample in the second sample set, wherein the second sample set comprises a reconstructed sample at a specific neighboring location of each of the one or more luminance compensation blocks, the one or more luminance compensation blocks comprise one or more of a first-type luminance compensation block and a second-type luminance compensation block, the first-type luminance compensation block comprises a luminance compensation block corresponding to a subblock on an upper edge of the current affine block, the second-type luminance compensation block comprises a luminance compensation block corresponding to a subblock on a left edge of the current affine block; and updating the predicted sample value of the current affine block based on the linear model coefficient, to obtain an updated predicted sample value of the current affine block.

* * * * *